United States Patent [19]

Lehman

[11] Patent Number: 4,694,409
[45] Date of Patent: Sep. 15, 1987

[54] MICROPROCESSOR BASED AIR INFLATION CONTROL SYSTEM

[75] Inventor: Michael E. Lehman, York, Pa.
[73] Assignee: Monorail, Inc., Auburn, N.Y.
[21] Appl. No.: 623,871
[22] Filed: Jun. 25, 1984
[51] Int. Cl.[4] ............... B60C 23/00; G05D 7/00; G06F 15/21
[52] U.S. Cl. .................. 364/558; 73/146.8; 222/52; 364/479
[58] Field of Search ............ 364/558, 464, 479; 73/146.3, 146.8; 116/32 R; 222/52

[56] References Cited

U.S. PATENT DOCUMENTS

| | | | |
|---|---|---|---|
| 668,535 | 2/1901 | Mesnage | 194/339 |
| 700,796 | 5/1902 | Molyneus | 194/295 |
| 3,878,376 | 4/1975 | Scholes, Jr. et al. | 364/558 |
| 3,908,460 | 9/1975 | Lichowsky | 73/398 R |
| 4,250,759 | 2/1981 | Vago et al. | 73/373 |
| 4,253,480 | 3/1981 | Kessel et al. | 137/102 |
| 4,289,225 | 9/1981 | Scholta | 222/3 |
| 4,333,491 | 6/1982 | Knubley | 73/146.8 |
| 4,502,842 | 3/1985 | Currier et al. | 364/558 |

Primary Examiner—Felix D. Gruber
Assistant Examiner—Daniel W. Juffernbruch
Attorney, Agent, or Firm—Beveridge, DeGrandi & Weilacher

[57] ABSTRACT

A microprocessor based system for monitoring the air pressure within an inflatable device and controlling the supplying of air to or venting of air from the device, as needed. A microprocessor based system controller includes controls for setting a desired air pressure signal and an input for receiving an actual air pressure signal from a pressure transducer connected to the inflatable device. If the desired air pressure signal is less than the actual air pressure signal, the system controller provides a vent control signal for application to an air vent control device to cause venting of air from the inflatable device. If the desired air pressure signal is greater than the actual air pressure signal, the system controller provides a fill control signal for application to an air inflating device to provide air to the inflatable device. In addition, the system controller provides a compressor actuation signal for application to an air compressor to provide air to the air inflating device as needed and an intermittent indicator signal for indicating provision of air to or venting of air from the inflatable device. The fill and vent control signals are of durations determined by the difference in the desired air pressure and the actual air pressure, following which the actual air pressure is again monitored and compared with the desired air pressure and, if appropriate, the filling or venting cycle repeated.

11 Claims, 6 Drawing Figures

MICROPROCESSOR BASED AIR INFLATION CONTROL SYSTEM

BACKGROUND OF THE INVENTION

The present invention pertains to an air inflation control system for adjusting the air pressure within an inflatable device. More particularly, the present invention pertains to a microprocessor based system for monitoring the air pressure within an inflatable device and controlling the supplying of air to and venting of air from the inflatable device, as needed. The system can be implemented in a manner requiring insertion of one or more coins to enable activation, if desired. Further, this system can provide other air-related options, such as a vacuum cleaning capability.

Optimum operation of automobiles and trucks requires that the tires of such vehicles be inflated to a proper level. If the inflation level is lower than it should be, excessive fuel is consumed by the vehicle, and the tires wear out faster. If the inflation level is too high, tire wire is accelerated and the vehicle rides uncomfortably. To permit their customers to adjust their tire pressure, automobile service stations frequently have available for their customers a controlled, pressurized air supply, enabling the customers to add air to or vent air from truck and automobile tires as well as other inflatable devices such as bicycle tires, air mattresses, footballs, basketballs, and other such things. Frequently such air supply consists simply of an adjustable control enabling the customer to set the desired air pressure, and a hose connected to a pressurized air source and terminating in a valve adapted to mate with the air valve of an automobile tire. The accuracy of such air supplies is somewhat low, and the air supply can take an undesirably long time to inflate an inflatable device to a desired air pressure. Additionally, most such air supplies are incapable of automatically venting air from the inflatable device when the actual air pressure in the device is greater than the desired air pressure. Instead, air must be vented manually until the actual air pressure is below the desired air pressure, and then the device must be reinflated to the desired air pressure. Further, such air supplies generally have only one supply rate. Large volume devices, such as automobile or truck tires, are preferably filled at a relatively high rate; however, low volume devices such as bicycle tires and sports equipment are more safely filled at a slower rate to avoid overinflation and possible rupture or other damage.

The provision of such an air supply imposes an expense on the operator of the automobile service station or other establishment. Not only is a capital investment necessary to provide the air supply equipment, but also an operating expense is involved, generally for electricity to run a compressor, and maintenance costs are incurred. In order to more equitably apportion such costs to users, it is desirable that the air supply require payment of a charge to enable its operation, rather than burying the expense of the air supply in the prices of other goods sold by the service station, such as gasoline and motor oil.

SUMMARY OF THE INVENTION

The present invention is a microprocessor based system for monitoring the air pressure in an inflatable device and controlling the supplying of air to and the venting of air from such device. In accordance with the present invention, a first input is provided for receipt of an actual air pressure signal indicative of the air pressure in an inflatable device and application of such actual air pressure signal to a system controller. The system controller includes a pressure selector permitting a user to indicate a desired air pressure signal. The system controller is connectable to a numerical indicator for applying to such indicator an air pressure signal to cause the indicator to indicate the air pressure value of the applied air pressure signal. A switch is provided, selectively movable between a first position in which the controller provides the actual air pressure signal for application to the numerical indicator, to cause such numerical indicator to indicate the air pressure value of the actual air pressure signal, and a second position in which the controller provides the desired air pressure signal for application to the numerical indicator, to cause the numerical indicator to indicate the air pressure value of such desired air pressure signal. Control means are provided, selectively movable between a position in which the desired air pressure signal is increased, a position in which the desired air pressure signal remains static, and a position in which the desired air pressure signal is decreased. Thus this control means permits the user to adjust the desired air pressure signal as he wishes.

The system controller is responsive to the desired air pressure signal being less than the actual air pressure signal for providing a vent control signal for application to an air vent control device to cause such air vent control device to vent air from an inflatable device coupled to it. The system controller is also responsive to the desired air pressure signal being greater than the actual air pressure signal for providing a fill control signal for application to an air inflating device to cause such air inflating device to provide air to an inflatable device coupled to it. In addition, the system controller provides a compressor actuation signal for application to an air compressor to activate that air compressor to provide air to the air inflating device as needed, and an intermittent indicator signal for indicating provision of air to the inflatable device or venting of air from the inflatable device. In the preferred embodiment, the system controller is a microcomputer. If desired, the system controller can require the insertion of one or more coins before the air inflation control system is activated. Additional accessory functions can also be included, such as a vacuum for cleaning of car interiors.

BRIEF DESCRIPTION OF THE DRAWINGS

These and other aspects and advantages of the present invention are more apparent in the following detailed description and claims, particularly when considered in conjunction with the accompanying drawing in which like parts bear like reference numerals. In the drawings:

DETAILED DESCRIPTION OF A PREFERRED EMBODIMENT OF THE INVENTION

Figure 1:
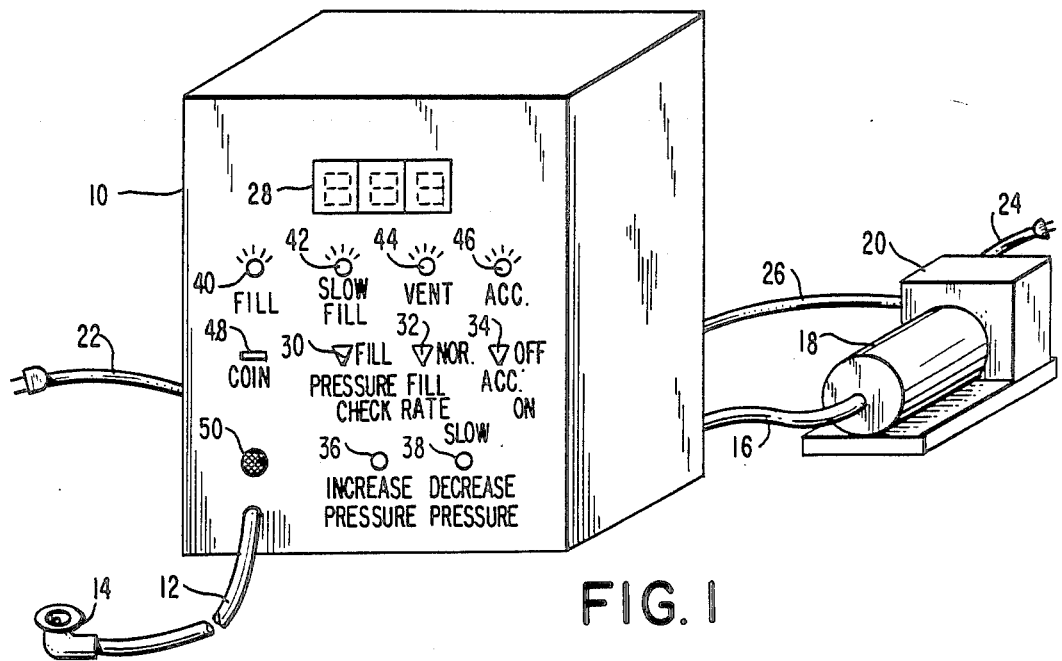
FIG. 1 is a perspective view depicting a microprocessor based system for monitoring the air pressure in an inflatable device and controlling the supplying of air to and venting of air from such device in accordance with one embodiment of the present invention.

The microprocessor based system of the present invention, for monitoring air pressure in an inflatable device and controlling the supplying of air to and venting of air from such a device, can be housed within a cabinet 10 as depicted in FIG. 1. An air hose 12 from cabinet 10 provides air to a valve 14 adapted for use in conjunction with the valve of an automobile or truck tire. Air hose 16 brings air from reservoir cylinder 18 to the components within cabinet 10. Compressor 20 provides air to cylinder 18. Power cable 22 permits connection of the electrical components within cabinet 10 to a suitable power source, while power cable 24 permits connection of compressor 20 to such a power source. Cables 22 and 24 could be replaced by a single cable if desired. Cable 26 connects compressor 20 to circuitry within cabinet 10 for control purposes.

The front panel of cabinet 10 includes indicator and control devices. Thus a numerical indicator 28 is provided to indicate air pressure. Switches on cabinet 10 include pressure switch 30 having fill and check positions, fill rate switch 32 having normal and slow positions, accessory switch 34 having off and on positions, increase pressure pushbutton 36, and decrease pressure pushbutton 38. With pressure switch 30 in its check position, indicator 28 indicates the air pressure within an inflatable device connected to valve 14. When pressure switch 30 is in its fill position, indicator 28 indicates the air pressure desired in the inflatable device which is, or is to be, connected to valve 14. Adding of air to and venting of air from the inflatable device can then take place. If the air pressure within an inflatable device connected to valve 14 is less than the desired air pressure set on indictor 28, and the system is enabled to provide air to the inflatable device, fill indicator 40 is energized, and the system opens valves to provide air from cylinder 18 through hoses 16 and 12 and valve 14 to the inflatable device. Compressor 20 is activated as needed to maintain sufficient pressurized air in reservoir cylinder 18. During filling of large volume inflatable devices such as automobile or truck tires, fill rate switch 32 is in its normal position. During filling of low volume inflatable devices, the system is set to supply the air at its slow fill rate, as a result of fill rate switch 32 being set to its slow position, and slow fill indicator 42 is energized in addition to fill indicator 40. If the air pressure within the inflatable device is greater than the desired air pressure set on indicator 28 and the system is enabled to vent air from the inflatable device, vent indicator 44 is energized and the system opens valves to vent air from the inflatable device through valve 14 and hose 12. When accessory switch 34 is in its on position and the system is enable to operate an accessory device, accessory indicator 46 is energized, and the accessory device (not shown) is actuated. Supplying and venting of air cannot take place at such times. Each indicator 40 through 46 can be a light emitting diode, by way of example. When pushbutton 36 is depressed, the desired air pressure is increased, and so the indication of desired air pressure on indicator 28 increases. Conversely, when pushbutton 38 is depressed, the desired air pressure, and the indication on indicator 28, decrease. Coin input slot 48 is provided in housing 10 to permit insertion of coins to activate the system when the system is operating in the mode requiring use of such coins. Loudspeaker 50 is provided in housing 10 for generating intermittent tone or beep indications as air is being applied to or vented from an inflatable device.

Figure 2:
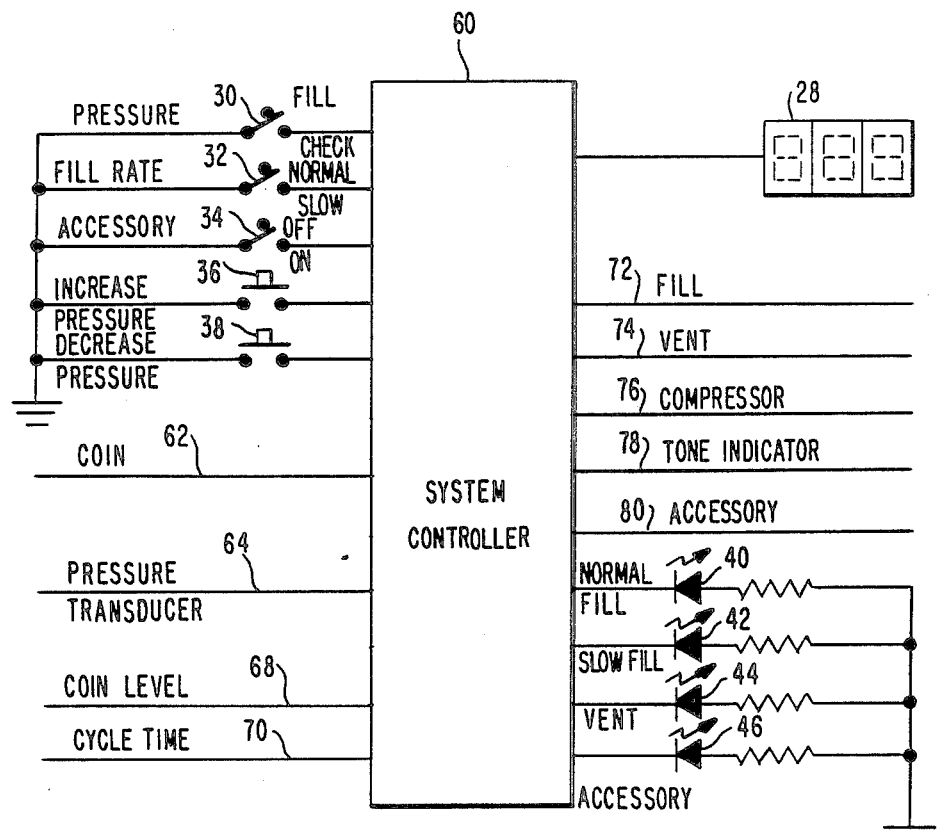
FIG. 2 is a functional block diagram of an embodiment of the present invention.

FIG. 2 is a functional block diagram of the system of the present invention. Each switch 30, 32, and 34 and each pushbutton 36 and 38 is connected so that in its closed position it grounds an input to system controller 60. Each light emitting diode 40, 42, 44, and 46 has its cathode connected to an output from system controller 60 and its anode coupled through a resistor to ground. Indicator 28 receives signals from system controller 60 to enable it to provide indications of desired air pressure or actual air pressure, depending upon the position of switch 30. Coins inserted through slot 48 are detected by a suitable coin detector which applies a signal on input line 62 to system controller 60. A pressure transducer signal, indicative of the air pressure within an inflatable device to which valve 14 couples hose 12, is applied by line 64 to another input of system controller 60. A signal indicative of the number of coins which must be inserted to activate the system is applied to system controller 60 by line 68. Similarly, a signal indicative of the cycle time for which the system is activated by the receipt of the appropriate number of coins is applied to system controller 60 on input line 70. System controller 60 provides a control signal on output line 72 to components within the system which actuate the appropriate valves to cause air from air line 16 to be applied through air line 12 and valve 14 to an inflatable device. In like manner, output line 74 applies signals from system controller 60 to valves to vent air from the inflatable device through the valve 14 and air line 12. System controller 60 also applies signals on output line 76, which is within cable 26, to activate compressor 20 to apply air to reservoir cylinder 18. Output line 78 applies intermittent tone indications to loudspeaker 50 when air is being applied to an inflatable device. Output line 80 energizes accessory equipment such as a vacuum cleaner or other such device when the system has been enabled by insertion of an appropriate number of coins and accessory switch 34 is in its on position.

Figure 3:
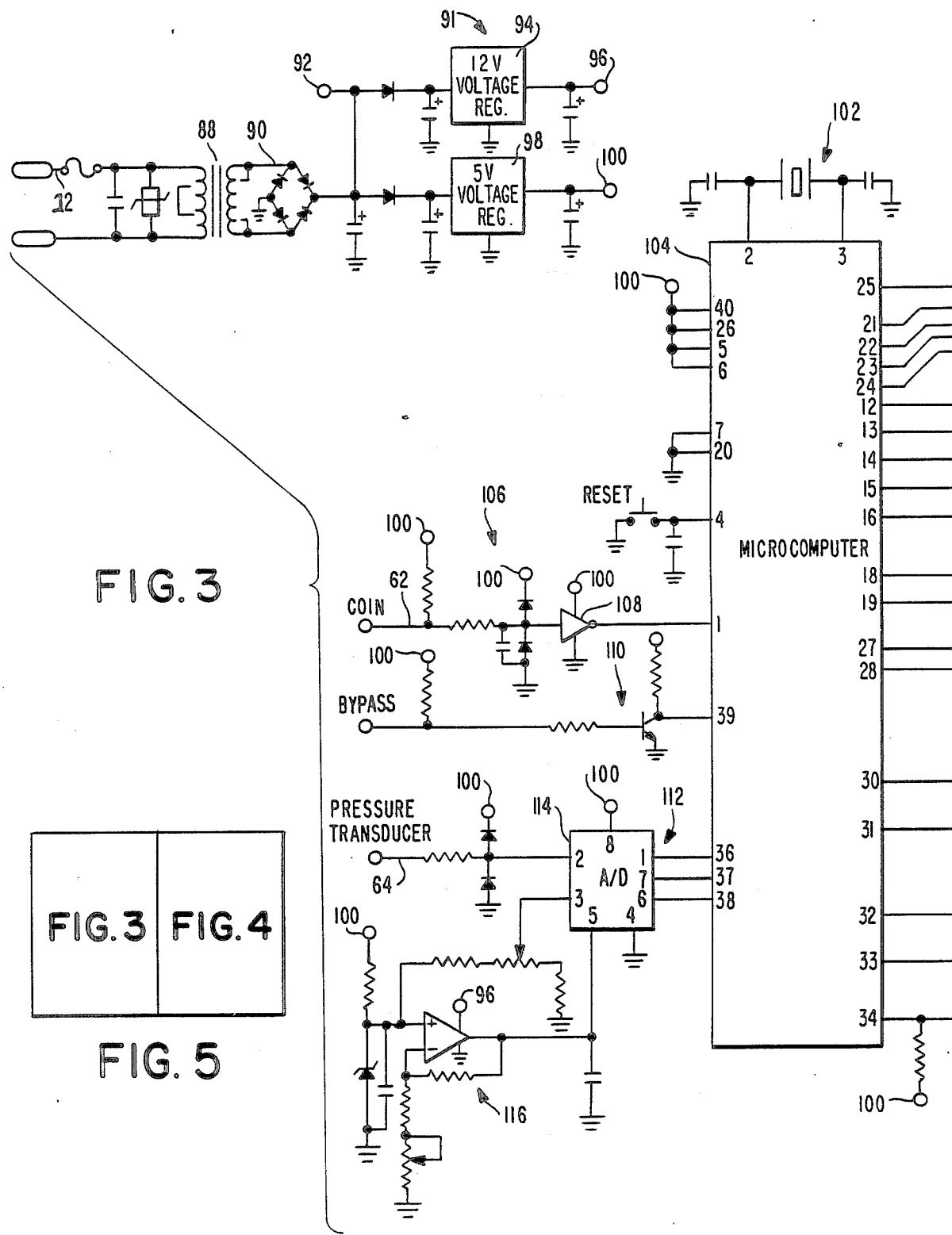
FIGS. 3 and 4, when positioned as depicted in FIG. 5, comprise a block diagram of a microprocessor based system for monitoring the air pressure in an inflatable device and controlling the supplying of air to and venting of air from such device, in accordance with a preferred embodiment of the present invention.
Figure 4:
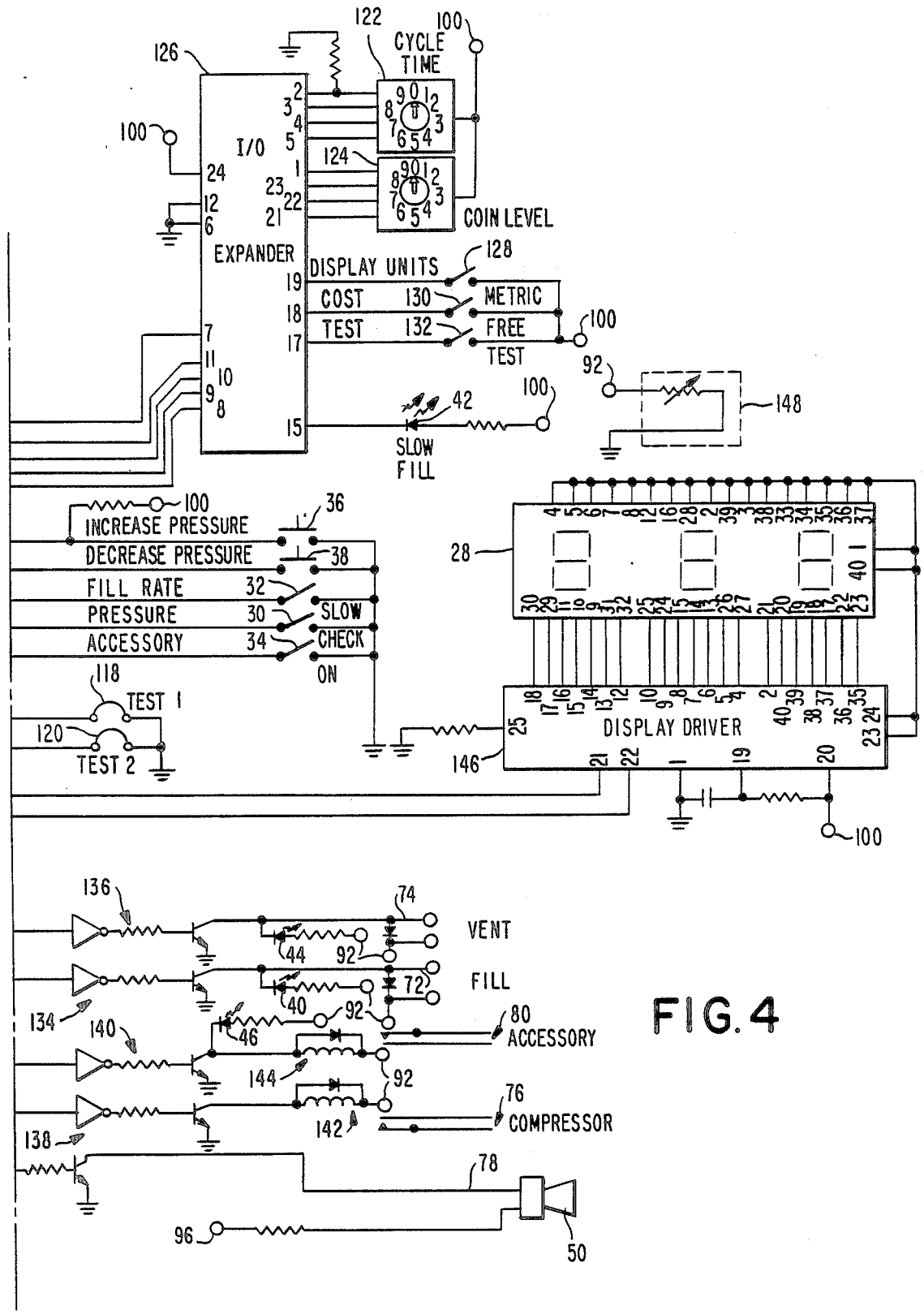

When FIGS. 3 and 4 are positioned as depicted in FIG. 5, they form a schematic block digram of a preferred embodiment of the present invention. Power cable 22 applies ac power through step down transformer 88 and full wave rectifier 90 to power supply 91. Output terminal 92 of power supply 91 is connected to the output of rectifier 90 to provide an unregulated 12 to 15 volt output. The output of rectifier 90 is also applied through voltage regulator 94 to regulated 12 volt output terminal 96 and through voltage regulator 98 to regulated 5 volt output terminal 100. Unregulated output terminal 92 is connected to each of the other terminals 92 in FIGS. 3 and 4. Similarly, regulated 12 volt output terminal 96 is connected to each of the other terminals 96 in FIGS. 3 and 4, and regulated 5 volt output terminal 100 is connected to each of the other terminals 100 in FIGS. 3 and 4.

Crystal controlled oscillator 102, having a frequency of 3.579545 megahertz, is coupled to microcomputer 104 to provide timing signals for the system. Microcomputer 104 is preferably an 8748 8-bit microcomputer available from Intel Corporation, although other microcomputers, such as 8048, might be used. If an 8748 or 8048 microcomputer is used, then the pin connections are as indicated in FIG. 3. The coin detector input on line 62 is frequency limited by filter assembly 106 and applied through Schmitt trigger 108 to microcomputer 104. A bypass input signal can be applied through inverter 110 to the microcomputer to make the system operable regardless of whether input line 62 has indicated receipt of the required number of coins.

The pressure transducer input, which is received on input line 64 and which is generally an analog signal, is applied through analog to digital converter assembly 112 to the microcomputer. Preferably analog to digital converter assembly 112 is based on an ACD0831 analog to digital converter 114 wuch as available from National Semiconductor Corporation, and in such case the pin connections are as shown in FIG. 3. The pressure transducer signal can be a one to five volt d.c. signal proportional to the gauge pressure. Analog to digital converter 114 is then referenced to plus one volt d.c. by reference voltage network 116 in order to offset the zero shift of the transducer.

Front panel switches 30, 32, and 34 and pushbuttons 36 and 38 are connected so that when closed they ground associated input ports of microcomputer 104. As shown in FIGS. 3 and 4, two additional input ports can be grounded by jumpers 118 and 120 as desired to permit testing of the system. Cycle time selector switch 122 and coin level selector switch 124 are connected through input/output expander 126 to inputs of the microcomputer. By way of example, expander 126 can be an 8243 input/output expander, in which case the pin connections are as shown in FIG. 4. Cycle time selector switch 122 can permit the setting of a cycle time of, for example, from zero to nine minutes. If zero minutes is selected, the cycle runs continuously. In like manner, coin level selector switch 124 can be set to require insertion of, for example, from zero to nine coins in order to activate the system. If zero coins are required, all of the system functions are free. Normally the display on indicator 28 is in English units, namely, pounds per square inch. However, closing of switch 128, which is coupled through expander 126 to the microcomputer, causes the display to be in metric units, namely kilopascals. Similarly, normal operation requires insertion of a number of coins as determined by the setting of switch 124, but closure of switch 130, which is coupled through expander 126 to the microcomputer, causes all the operation to be free. Closure of switch 132, which is likewise coupled through input/output expander 126 to microcomputer 104, permits testing for maintenance and trouble shooting purposes. When switch 132 is closed, each of the front panel switches is assigned to an output indicator which then can be energized by cosing the associated switch.

An output port of microcomputer 104 is applied through isolating circuit 134 to the fill output line 72 and fill indicator 40. In like manner, another output port from the microcomputer is applied through isolating circuit 136 to vent output line 74 and vent indicator 44. Two further output ports from microcomputer 104 are applied through isolating circuits 138 and 140, to relays 142 and 144 which respectively control the compressor output line 76 and the accessory output line 80. Isolation circuit 140 also controls accessory indicator 46. Slow fill indicator 42 is connected to a port of input/output expander 126. Another output port of the microcomputer is connected through isolating circuit 142 to output line 78 which is connected to loudspeaker 50 to provide an intermittent tone signal while an inflatable device is being inflated.

Two output ports of microcomputer 104 are applied to display driver 146, which by way of example might be a MM5452 display driver having the pin connections shown in FIG. 4. Display driver 146 is connected to liquid crystal display 28 to provide the driving waveforms. Display heater 148 is mounted directly to the rear of the liquid crystal display to permit operation of the display during low ambient temperatures.

When a person wishes to check and adjust the air pressure within an inflatable device, the person first places pressure switch 30 into its check position and then connects valve 14 to the air valve of the inflatable device. Indicator 28 indicates the air pressure within the inflatable device. This might be done without requiring insertion of any coins. To adjust the air pressure within the inflatable device, the person returns pressure switch 30 to its fill position and inserts the requied number of coils. Indicator 28 then indicates a desired air pressure. If that is not the air pressure which the person wants in the inflatable device, the person either increases the desired pressure by pushing pushbutton 36 or decreases the desired pressure by pushing pushbutton 38. Each time pushbutton 36 or 38 is pressed, the indicated desired pressure increases or decreases by one pound per square inch. Pressing and holding pushbutton 36 or 38 for at least one second causes the indicated desired pressure to increase or decrease at a rate of approximately seven pounds per square inch per second. If the indicated desired pressure increases to 70 pounds per square inch, further increasing stops, and pushbutton 36 must be held for at least five seconds before the desired pressure will increase further. This delay is a precaution to prevent accidental setting of an overly high pressure. The desired pressure can not be set above 100 pounds per square inch. If a large volume device is to be inflated, for example an automobile or truck tire, fill rate switch 32 is placed in its normal position. If a small volume device such as a bicycle tire, an air mattress, or an inflated ball is to be filled, then switch 32 is placed in its slow position. Slow fill indicator 42 should then be energized. Valve 14 is then connected to the valve of the inflatable device. A reading of the pressure within the inflatable device is applied to controller 60 by input line 64. If the desired pressure is greater than the actual pressure, then microcomputer 104 applies a signal to indicator 40 and fill output line 72, actuating valves to permit passage of air from reservoir cylinder 18 and air line 16 to air line 12 and valve 14 and then into the inflatable device. Microcomputer 104 also applies a signal to relay 142 to provide a signal on compressor output line 76 as needed to activate compressor 20 to retain an appropriate volume of air in cylinder 18. If the air pressure within the inflatable device is greater than the desired pressure, microcomputer 104 applies a signal to indicator 44 and vent output line 74, actuating valves to permit venting of air from the inflatable device through valve 14 and air line 12. As air is being applied to or vented from the inflatable device, an intermittent signal is applied by microcomputer 104 to tone indicator output line 78 to cause an intermittent beep or tone indication from loudspeaker 50 which ends once the actual air pressure within the inflatable device reashes the desired air pressure, thus alerting the user that the desired air pressure has been reached. At any point during the filling or venting operation, the user may change the position of any of the front panel switches 30, 32, or 34 to read the actual pressure, change the fill rate or activate an accessory device such as a vacuum cleaner, or may activate either of the pushbuttons 36 or 38 to change the desired pressure.

The proprietor of the establishment at which the system of the present invention is installed for operation must set cycle time switch 122 and coil level switch 124, as well as display units switch 128. Either a mechanical coin acceptor or an optical coil acceptor can be utilized, so long as the coin acceptor provides an appropriate signal on line 62 each time a coin is inserted.

On initial turn-on of the system, microcomputer 104 clears its data memory, initializes display driver 146 and analog to digital converter 114, and then checks the input port to which test switch 132 is coupled. If switch 132 is closed to place the system into its test mode, the system undergoes evaluation testing, including activation of the various indicators 40 through 46 in response to actuation of the appropriate switches and pushbuttons 30 through 38.

During normal operation, microcomputer 104 monitors the input from coin level switch 124 to determine the number of coins which must be inserted to cause operation of the system and then monitors the coin input. If insertion of a number of coins is detected equal to the number for which switch 124 is set, microcomputer 104 initiates a paid function and monitors the input from cycle time switch 122 to determine the length of time that the paid cycle is to run. This data is loaded into a cycle time counter and the operation is initiated. Front panel switches and pushbuttons 30 through 38 are monitored and the selected function is initiated. During the pressure check function, microcomputer 104 inhibits its output lines 72 through 80, except that if at the time the pressure check function is initiated, an output is present on compressor output line 76, that output is permitted to continue to prevent the compressor from stalling on turn-on with the air hose pressurized. The pressure transducer input on line 64 is then monitored and converted to the appropriate indication for display on indicator 28.

During the fill operation, a reading of the pressure indicated by the pressure transducer input on line 64 is compared with the desired pressure to determine whether the actual pressure is above or below the desired pressure. If fill switch 32 is in its slow position, microcomputer 104 determines whether the actual pressure is within one pound per square inch of the desired pressure. If it is, the operation is stopped. If the pressure difference is greater than one pound per square inch, an output signal is applied to fill output line 72 or vent output line 74, as appropriate, for a preset interval to increment the actual pressure, and then the cycle is repeated by again monitoring the actual pressure and comparing it with the desired pressure. If fill switch 32 is in its normal position, the measured actual pressure is compared with the target pressure and the result is used to determine whether to provide the fill output signal on line 72 or the vent output signal on line 74 for a preselected period of time. If the pressure difference is less than 20 pounds per square inch, then a fill or vent time ranging from 0.45 seconds to 7.72 seconds is utilized, with the time being related to the pressure difference. If the difference between the desired pressure and the actual pressure is greater than 20 pounds per square inch, then a one second fill or vent time is utilized. This one second fill or vent time for pressure differences greater than 20 pounds per square inch prevents under or over filling of the inflatable device as a result of an erroneous pressure reading as valve 14 is first connected to the inflatable device. The selected vent or fill time is applied to a timer for either the solenoid controlling the valve for filling or the solenoid controlling the valve for venting, and that timer is started and an output provided on tone indicator output line 78. When the timer indicates the selected time has elapsed, the fill or vent signal on line 72 or 74 and the intermittent tone signal on line 78 are terminated, and the pressure within the inflatable device is again read and compared with the desired pressure. If the differences is more than one pound per square inch, the operation repeats. If the difference is less than one pound per square inch, the operation stops until valve 14 is connected to the valve of another tire or other inflatable device to provide a new pressure reading in line 64.

Figure 6:
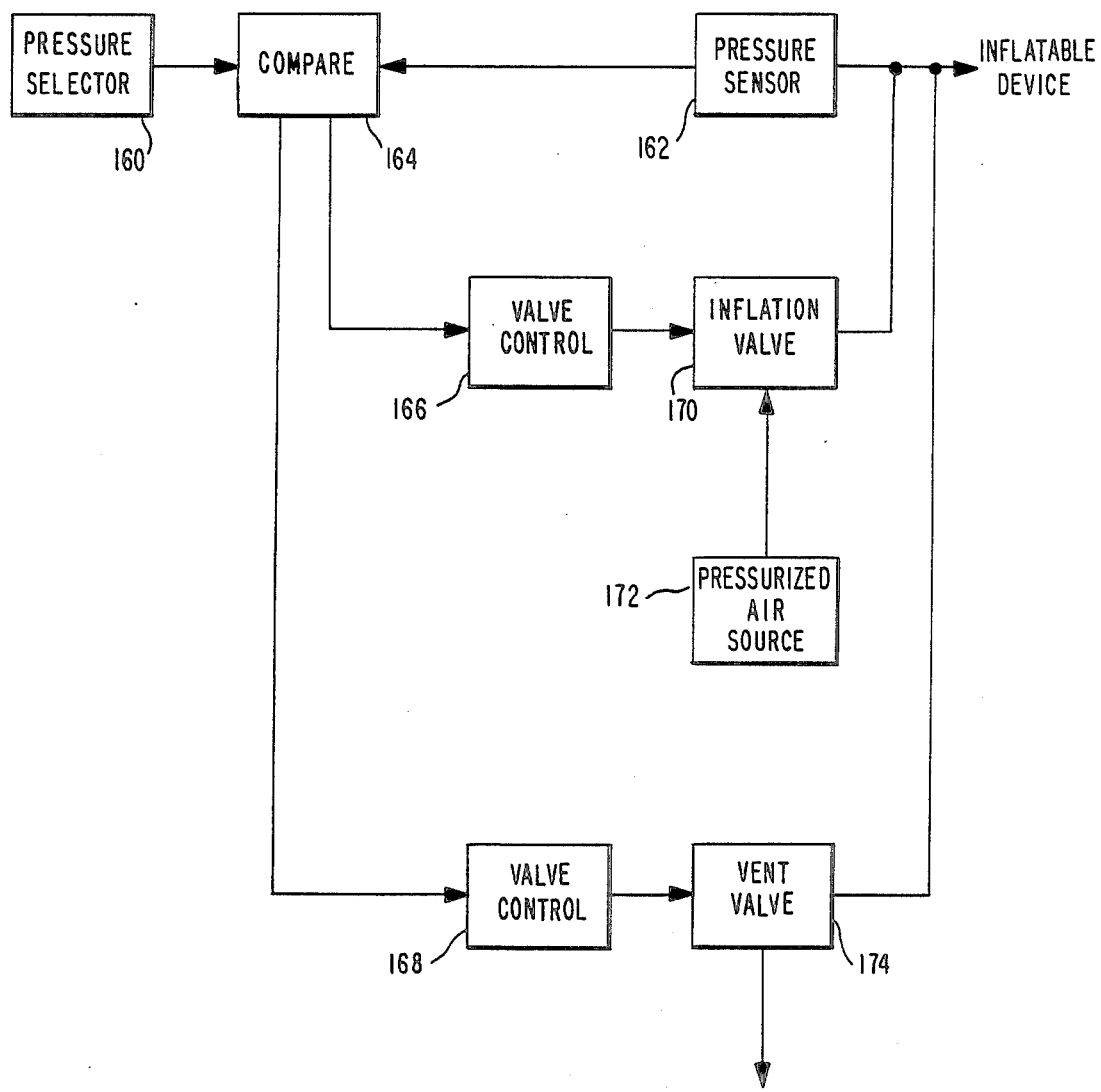
FIG. 6 is a more detailed functional block diagram of the embodiment of FIG. 1.

FIG. 6 is a functional block diagram showing pressure selector 160 and pressure sensor 162 applying inputs to comparer 164 which activates valve control 166 or valve control 168, depending upon whether the actual air pressure sensed in the inflatable device is less than or greater than the desired air pressure. Valve control 166 controls inflation valve 170 through which pressurized air from source 172 passes to the inflatable device, while valve control 168 controls vent valve 174 through which air from the inflatable device is vented.

In the preferred embodiment of the present invention, microcomputer 104 is an 8748 single component 8-bit microcomputer from Intel Corporation. Following is the program for the microcomputer.

```
                      MICRO-AIR  SOFTWARE

0000

;  *****  DATA AREAS AND EQUATES  *****

0020                      DATA    EQU     32
0020                      DSPBUF  EQU     DATA     ;DISPLAY BUFFER (3 DIGIT)
0024                      COINFL  EQU     DATA+4   ;COIN SWITCH LOGIC FLAG
0025                      PAID    EQU     DATA+5   ;PAID FLAG
0026                      PAIDSS  EQU     DATA+6   ;PAID SINGLE SHOT FLAG
0027                      PAYMOD  EQU     DATA+7   ;PAID FUNCTION
0028                      COINCT  EQU     DATA+8   ;COIN COUNT
002A                      KDELAY  EQU     DATA+10  ;KEY DELAY TIME  (FOR AUTO REPEAT)
002B                      VLVTIM  EQU     DATA+11  ;VALVE TIMER
002C                      NULL    EQU     DATA+12
002D                      RPDLFL  EQU     DATA+13  ;READ PRESSURE DELAY STARTED FLAG
002E                      AASTRT  EQU     DATA+14  ;AUTO AIR DELAY STARTED FLAG
002F                      CYCINP  EQU     DATA+15  ;CYCLE IN PROGRESS FLAG
0030                      LSTKEY  EQU     DATA+16  ;LAST KEY VALUE
```

```
0031                    MODE    EQU     DATA+17  ;MODE
0032                    SETPT   EQU     DATA+18  ;PRESSURE SETPOINT
0033                    CYCTIM  EQU     DATA+19  ;CYCLE TIME
0037                    SLOFIL  EQU     DATA+23  ;LOW VOLUME SLOW FILL FLAG

003F                    ENDATA  EQU     DATA+31

0021                    LONGD   EQU     1*33             ;LONG KEY DELAY
0005                    SHORTD  EQU     5                ;SHORT KEY DELAY
0042                    AADLTM  EQU     2*33             ;AUTO AIR START DELAY (SECONDS)
0001                    UPKEY   EQU     1                ;UP ARROW KEY
0002                    DNKEY   EQU     2                ;DOWN ARROW KEY

0001                    UPMOD   EQU     1H               ;UP MODE
0002                    DNMOD   EQU     2H               ;DOWN MODE
0004                    SLOMOD  EQU     4H               ;SLOW FILL MODE
0008                    CHKMOD  EQU     8H               ;CHECK PRESSURE MODE
0010                    WTRMOD  EQU     10H              ;WATER MODE
0020                    VACMOD  EQU     20H              ;VACUUM MODE
0001                    SWTCH1  EQU     1                ;OPTION SWITCH - NOT USED
0002                    SWTCH2  EQU     2                ;OPTION SWITCH - FREE AIR
0004                    SWTCH3  EQU     4                ;OPTION SWITCH - FREE WATER
0008                    SWTCH4  EQU     8                ;OPTION SWITCH - METRIC
001E                    TIMDIV  EQU     256-226          ;TIMER DIVIDER

0018                    REGB1   EQU     24               ;START OF REGISTER BANK 1

001D                    AADELY  EQU     REGB1+5          ;AUTO AIR START DELAY (RB1, R5)
001B                    RDLTMR  EQU     REGB1+3          ;READ PRESSURE (AUTO FILL) DELAY
001A                    CHKTIM  EQU     REGB1+2          ;CHECK PRESSURE DISPLAY UPDATE DELAY
0019                    KEYBEP  EQU     REGB1+1          ;KEY BEEP TIMER

PULSE   MACRO
                        ORL     P2,#10H
                        ANL     P2,#(NOT 10H)
                        ENDM
0000

;  *****  PROGRAM START  *****

0000  C5        START:  SEL     RB0
0001  54 6E             CALL    ADCONV           ;INITIALIZE A/D
0003  54 9C             CALL    CLRALL           ;CLEAR ALL DATA MEMORY
0005  04 09             JMP     START1

0007  64 55             JMP     TIMER

0009  B8 24     START1: MOV     R0,#COINFL       ;COIN LOGIC ( ACTIVE HIGH OR LOW )
000B  26 10             JNT0    START2           ;ACTIVE HIGH COIN INPUT (N.O. SWITCH)
000D  10                INC     @R0              ;COIN INPUT IS AN OPTO  (ACTIVE LOW) R0 SET TO 1
000E  04 10             JMP     START2

0010  54 AF     START2: CALL    DISPLA           ;INITIALIZE DISPLAY 0012  0F                MOVD    A,P7             ;GET OPTION SWITCHES
0013  12 17             JB0     STRTMR           ;NO SELF-TEST... START TIMER
0015  64 A9             JMP     TEST             ;EXECUTE SWITCH TEST ROUTINE 0017  23 1E     STRTMR: MOV     A,#TIMDIV
0019  62                MOV     T,A
001A  55                STRT    T                ;LOAD AND START TIMER
001B  25                EN      TCNTI            ;ENABLE TIMER INTERRUPTS 001C  85                CLR     F0
001D  95                CPL     F0               ;RESET THE SLOW FILL FLAG
001E  27                CLR     A
001F  9E                ANLD    P6,A             ;TURN OFF THE SLOW FILL INDICATOR 0020  89 7C     EXIT1:  ORL     P1,#01111100B    ;ALL OUTPUTS OFF
0022  99 7F             ANL     P1,#01111111B    ;BEEPER OFF 0024  54 DE             CALL    DSPDSH           ;DISPLAY DASHES ON THE DISPLAY

0026  B8 25             MOV     R0,#PAID
0028  BC 13             MOV     R4,#19           ;19 LOCATIONS TO CLEAR
002A  35                DIS     TCNTI
002B  54 A0             CALL    CLRMEM           ;RESET ALL CYCLE FLAGS
002D  25                EN      TCNTI
002E  A5                CLR     F1               ;RESET THE BEEP FLAG
002F  04 51             JMP     COIN?            ;START MAIN PROCESSING LOOP

;  *****  START OR RESTART A FUNCTION CYCLE  *****

0031  B8 2F     LOOP:   MOV     R0,#CYCINP
0033  F0                MOV     A,@R0            ;CYCLE IN PROGRESS ??
0034  C6 3D             JZ      STRTCY           ;NO... START IT
```

```
0036    BB 26              MOV     R0,#PAIDSS      ;SINGLE SHOT PAID FLAG
0038    F0                 MOV     A,@R0
0039    C6 51              JZ      COIN?           ;PAID CYCLE ALREADY STARTED
003B    B0 00              MOV     @R0,#0          ;RESET PAID SINGLE SHOT AND START A NEW CYCLE 003D    0C         STRTCY: MOVD    A,P4            ;GET TIME SWITCH
003E    D3 0F              XRL     A,#0FH          ;SWITCH DATA IS INVERTED
0040    A9                 MOV     R1,A
0041    BA 3C              MOV     R2,#60          ;SWITCH MULTIPLIER FOR MINUTES
0043    74 43              CALL    MULT 0045    35                 DIS     TCNTI
0046    BB 33              MOV     R0,#CYCTIM
0048    A0                 MOV     @R0,A           ;LOAD CYCLE TIMER MSD
0049    18                 INC     R0
004A    F9                 MOV     A,R1
004B    A0                 MOV     @R0,A           ;LOAD CYCLE TIMER LSD
004C    25                 EN      TCNTI

004D    BB 2F      SETCIP: MOV     R0,#CYCINP      ;SET CYCLE IN PROGRESS FLAG
004F    B0 01              MOV     @R0,#1

;  *****  CHECK FOR A COIN  *****

0051    0D         COIN?:  MOVD    A,P5
0052    D3 0F              XRL     A,#0FH          ;SWITCH DATA IS INVERTED
0054    C6 92              JZ      PAID2           ;IF COIN SWITCH = 0 SET THE PAID FLAG
0056    56 92              JT1     PAID2           ;IF BYPASS SWITCH ON SET THE PAID FLAG
0058    BB 24              MOV     R0,#COINFL      ;GET COIN POLARITY FLAG
005A    F0                 MOV     A,@R0
005B    C6 61              JZ      ACTHI1          ;CHECK FOR ACTIVE HIGH INPUT
005D    26 65              JNT0    COIN?1          ;COIN INPUT IS ACTIVE LOW... DEBOUNCE IT
005F    04 96              JMP     MAIN 0061    36 65      ACTHI1: JT0     COIN?1          ;COIN INPUT HIGH
0063    04 96              JMP     MAIN 0065    54 AE      COIN?1: CALL    DEBNCE          ;15 MS DEBOUNCE
0067    F0                 MOV     A,@R0
0068    C6 6E              JZ      ACTHI2          ;CHECK FOR ACTIVE HIGH COIN SWITCH
006A    26 72              JNT0    COIN            ;REAL COIN
006C    04 96              JMP     MAIN            ;FAILED DEBOUNCE TEST 006E    36 72      ACTHI2: JT0     COIN            ;IT'S A REAL COIN
0070    04 96              JMP     MAIN            ;FAILED DEBOUNCE TEST 0072    09         COIN:   IN      A,P1
0073    AB                 MOV     R3,A
0074    89 1C              ORL     P1,#00011100B   ;TURN OFF ALL VALVES
0076    F0                 MOV     A,@R0           ;GET COIN SWITCH AGAIN
0077    C6 7D              JZ      ACTHI3
0079    26 79      WAIT1:  JNT0    WAIT1           ;WAIT FOR COIN TO DROP
007B    04 7F              JMP     COIN1

007D    36 7D      ACTHI3: JT0     ACTHI3          ;WAIT FOR COIN TO DROP

007F    FB         COIN1:  MOV     A,R3
0080    39                 OUTL    P1,A            ;RESTORE OUPUTS
0081    54 AE              CALL    DEBNCE          ;DEBOUNCE RELEASE

0083    BB 28              MOV     R0,#COINCT      ;COIN COUNT
0085    10                 INC     @R0             ;BUMP THE COIN COUNT
0086    0D                 MOVD    A,P5            ;GET THE NUMBER OF COINS SWITCH
0087    D3 0F              XRL     A,#0FH          ;SWITCH DATA IS INVERTED
0089    D0                 XRL     A,@R0           ;COIN SWITCH - COIN COUNT
008A    96 96              JNZ     MAIN            ;COIN COUNT = SWITCH SETTING

008C    B0 00      PAID1:  MOV     @R0,#0          ;RESET THE COIN COUNT
008E    BB 26              MOV     R0,#PAIDSS      ;COIN COUNT >= SWITCH SETTING
0090    B0 01              MOV     @R0,#1          ;SET THE PAID SINGLE SHOT FLAG
0092    BB 25      PAID2:  MOV     R0,#PAID
0094    B0 01              MOV     @R0,#1          ;SET THE STATIC PAID FLAG

;  *****  CHECK FOR CYCLE TIMEOUT  *****

0096    BB 2F      MAIN:   MOV     R0,#CYCINP
0098    0C                 MOVD    A,P4            ;GET TIME SWITCH
0099    D3 0F              XRL     A,#0FH          ;SWITCH DATA INVERTED
009B    C6 A7              JZ      GETKEY          ;DON'T CHECK FOR CYCLE TIMEOUT IF NO CYCLE
009D    F0                 MOV     A,@R0
009E    C6 A7              JZ      GETKEY          ; IN PROGRESS OR IF TIME SWITCH = 0
00A0    BB 33              MOV     R0,#CYCTIM
00A2    F0                 MOV     A,@R0           ;CYCLE TIME = 0 ??
00A3    18                 INC     R0
00A4    40                 ORL     A,@R0
00A5    C6 20              JZ      EXIT            ; YES... EXIT
```

```
                        ; ***** GET KEYBOARD DATA *****

00A7    08          GETKEY: INS     A,BUS           ;GET KEY INPUTS
00A8    37                  CPL     A               ;KEY DATA IS INVERTED
00A9    53 3F               ANL     A,#3FH          ;STRIP UPPER 2 BITS
00AB    C6 CB               JZ      NK1             ;NO KEYS PRESSED

00AD    AA          GETKY1: MOV     R2,A            ;SAVE KEYBOARD VALUE
00AE    B9 31               MOV     R1,#MODE        ;GET CURRENT MODE
00B0    D1                  XRL     A,@R1           ;NEW MODE ?
00B1    C6 CD               JZ      EXEC1           ; NO... CHECK THE CURRENT MODE FOR ACTION

; ***** NEW MODE *****

00B3    54 A6       NEWMOD: CALL    DEBNCE          ;DEBOUNCE THE KEY INPUT
00B5    08                  INS     A,BUS           ;GET KEY DATA AGAIN
00B6    37                  CPL     A
00B7    53 3F               ANL     A,#3FH
00B9    DA                  XRL     A,R2            ;SAME AS BEFORE DEBOUNCE
00BA    96 A7               JNZ     GETKEY          ;NO... SKIP IT

00BC    B8 2A               MOV     R0,#KDELAY
00BE    BC 04               MOV     R4,#4           ;4 LOCATIONS TO CLEAR
00C0    54 A0               CALL    CLRMEM          ;RESET THE KEY DELAY FLAG, READ PRESS. DELAY
00C2    A5                  CLR     F1              ; STARTED FLAG, VALVE TIMER, AND BEEPER FLAG

00C3    54 8D               CALL    ONEKEY          ;ONLY ONE BIT SET IN KEYBOARD DATA BYTE ??
00C5    C6 D1               JZ      NMODE1          ;ONLY ONE BIT SET... CHECK THE KEY

00C7    89 7C               ORL     P1,#01111100B
00C9    99 7F               ANL     P1,#01111111B   ;UNKNOWN MODE (MORE THAN ONE SWITCH DOWN)
00CB    24 21       NK1:    JMP     NOKEYS          ;... OUTPUTS OFF AND SKIP IT

00CD    24 37       EXEC1:  JMP     EXECUT          ;GET OVER BOUNDARY
00CF    24 03       CHGM1:  JMP     CHGMOD          ;GET OVER BOUNDARY

00D1    FA          NMODE1: MOV     A,R2            ;GET KEY
00D2    D3 08               XRL     A,#CHKMOD       ;GOING INTO CHECK PRESSURE MODE ??
00D4    C6 CF               JZ      CHGM1           ;CHANGE TO THE PRESSURE CHECK MODE (ALWAYS FREE)

00D6    B8 25       NOTPCK: MOV     R0,#PAID        ;HAS A CYCLE BEEN PAID FOR

00D8    FA                  MOV     A,R2            ;GET THE KEY INPUT
00D9    53 07               ANL     A,#7            ;ANY AIR MODE ... UP, DOWN, OR SLOW FILL
00DB    C6 EE               JZ      NMODE2          ;NO... NOT ONE OF THE AIR MODES

00DD    0F                  MOVD    A,P7            ; GET SWITCHES
00DE    37                  CPL     A
00DF    53 02               ANL     A,#SWTCH2       ;CHECK FREE AIR SWITCH
00E1    40                  ORL     A,@R0           ;IS AIR FREE OR HAS A CYCLE BEEN PAID FOR ??
00E2    C6 CD               JZ      EXEC1           ;NO... JUST EXECUTE THE OLD MODE
00E4    04 CF               JMP     CHGM1           ;YES.. CHANGE MODES

00E6    FA          NMODE2: MOV     A,R2
00E7    D3 10               XRL     A,#WTRMOD       ;GOING INTO WATER MODE ??
00E9    96 F4               JNZ     NMODE3          ;NO... CHECK FOR VACUUM MODE

00EB    0F                  MOVD    A,P7            ;GET SWITCHES
00EC    37                  CPL     A
00ED    53 04               ANL     A,#SWTCH3       ;CHECK THE FREE WATER SWITCH
00EF    40                  ORL     A,@R0           ;IS WATER FREE OR HAS A CYCLE BEEN PAID FOR ??
00F0    96 CF               JNZ     CHGM1           ; YES... CHANGE MODES
00F2    04 FC               JMP     CHKAAR          ; NO... CHECK TO SEE IF AUTO AIR IN PROGRESS

00F4    FA          NMODE3: MOV     A,R2
00F5    D3 20               XRL     A,#VACMOD       ;VACUUM MODE ??
00F7    96 CD               JNZ     EXEC1           ; NO... EXECUTE THE OLD MODE

00F9    F0                  MOV     A,@R0           ;VACUUM PAID FOR ??
00FA    96 CF               JNZ     CHGM1           ; YES... SO DO THE VACUUM
00FC    F1          CHKAAR: MOV     A,@R1           ;GET CURRENT MODE
00FD    53 03               ANL     A,#3            ;IF IN AUTO AIR MODE DON'T DO KEY REPEAT
00FF    96 21               JNZ     NOKEYS
0101    24 37               JMP     EXECUT          ; OTHERWISE... JUST EXECUTE OLD MODE

; ***** CHANGE THE OPERATING MODE *****

0103    FA          CHGMOD: MOV     A,R2            ;GET THE KEY
0104    53 07               ANL     A,#7            ;AUTO AIR UP OR DOWN OR SLOW FILL ??
0106    96 0D               JNZ     COMPON          ;YES... KEEP THE COMPRESSOR ON

0108    FA                  MOV     A,R2            ;GET KEY
0109    D3 08               XRL     A,#CHKMOD
010B    96 11               JNZ     ALLOFF          ;NOT GOING INTO CHECK PRESSURE MODE... ALL OFF 010D    89 3C       COMPON: ORL     P1,#00111100B   ;VALVES OFF ONLY WHEN CHANGING FROM UP TO DOWN
010F    24 13               JMP     CMODE1          ; OR TOGGLING SLOW FILL MODE 0111    89 7C       ALLOFF: ORL     P1,#01111100B   ;ALL OUTPUTS OFF ON MODE CHANGES (EXCEPT AUTO)

0113    B8 19       CMODE1: MOV     R0,#KEYBEE
0115    B0 03               MOV     @R0,#3          ;BEEP TIME
```

```
0117    FA              MOV     A,R2
0118    A1              MOV     @R1,A           ;STORE THE NEW MODE
0119    53 03           ANL     A,#3            ;AUTO AIR MODE ??? (UP, DOWN ) ??
011B    96 37           JNZ     EXECUT          ;CHECK TO SEE WHAT NEEDS TO BE DONE
011D    54 DE           CALL    DSPDSH          ;DISP. DASHES ON MODE CHANGES EXCEPT UP OR DOWN
011F    24 37           JMP     EXECUT

0121    B8 31   NOKEYS: MOV     R0,#MODE        ;GET THE MODE
0123    F0              MOV     A,@R0
0124    96 28           JNZ     NOKEY1          ;MODE IS ACTIVE
0126    04 51           JMP     COIN?           ;MODE=0... WAIT FOR A COIN OR A KEY

0128    D3 08   NOKEY1: XRL     A,#CHKMOD       ;PRESSURE CHECK MODE ?
012A    C6 4B           JZ      PRSCHK          ;GO CHECK PRESSURE AGAIN
012C    F0              MOV     A,@R0           ;GET CURRENT MODE
012D    53 03           ANL     A,#03H          ;AUTO AIR UP OR DOWN MODE ??
012F    C6 EF           JZ      GOLOOP          ; NO... JUST WAIT FOR CYCLE END

0131    B8 30   UDMODE: MOV     R0,#LSTKEY
0133    B0 00           MOV     @R0,#0          ;SET LAST KEY TO 0
0135    24 E0           JMP     AANOKY          ;CONTINUE WITH AUTO AIR ROUTINE

; ***** EXECUTE THE CURRENT MODE *****

0137    B8 31   EXECUT: MOV     R0,#MODE
0139    F0              MOV     A,@R0           ;GET THE CURRENT MODE
013A    96 3E           JNZ     CKMOD0
013C    04 51           JMP     COIN?           ;NO MODE TO DO... SKIP IT

013E    D3 20   CKMOD0: XRL     A,#VACMOD       ;VACUUM MODE ?
0140    96 46           JNZ     CKMOD1

; ***** VACUUM MODE *****

0142    99 DF   VACUUM: ANL     P1,#(NOT 00100000B)     ;TURN ON VACUUM RELAY
0144    04 31           JMP     LOOP

0146    F0      CKMOD1: MOV     A,@R0           ;GET KEY
0147    D3 08           XRL     A,#CHKMOD       ;CHECK PRESSURE MODE ??
0149    96 77           JNZ     CKMOD2          ;NO... KEEP LOOKING FOR A MATCH

; ***** CHECK PRESSURE MODE *****

014B    B8 1A   PRSCHK: MOV     R0,#CHKTIM
014D    F0              MOV     A,@R0           ;TIME TO CHECK THE PRESSURE??
014E    C6 52           JZ      CHKIT
0150    04 31           JMP     LOOP            ;NO... WAIT
0152    B0 11   CHKIT:  MOV     @R0,#17
0154    54 5E           CALL    GETPRS          ;GET PRESSURE READING
0156    AB              MOV     R3,A
0157    0F              MOVD    A,P7
0158    53 08           ANL     A,#SWTCH4
015A    C6 64           JZ      KPA             ;CONVERT TO KPA

015C    BA 00   DSPLBS: MOV     R2,#0
015E    54 EA   DSPKPA: CALL    BINBCD          ;CONVERT THE PRESSURE TO 7 SEG. LBS.
0160    54 AF           CALL    DISPLA
0162    04 31           JMP     LOOP

; ***** CONVERT LBS TO KPA *****

0164    B9 45   KPA:    MOV     R1,#69
0166    FB              MOV     A,R3
0167    AA              MOV     R2,A
0168    74 43           CALL    MULT            ;LBS * 69

016A    AA              MOV     R2,A
016B    F9              MOV     A,R1            ;CHANGE REGISTERS FOR DIVIDE
016C    AB              MOV     R3,A
016D    23 0A           MOV     A,#10
016F    74 14           CALL    DIV             ;(LBS * 69) / 10 = KPA

0171    FB              MOV     A,R3
0172    AA              MOV     R2,A            ;CHANGE REGISTERS FOR CONVERSION
0173    FC              MOV     A,R4
0174    AB              MOV     R3,A
0175    24 5E           JMP     DSPKPA          ;DISPLAY THE RESULTS

0177    F0      CKMOD2: MOV     A,@R0           ;GET MODE
0178    D3 10           XRL     A,#WTRMOD       ;WATER MODE ??
017A    96 80           JNZ     CKMOD3          ; NO... CHECK THE NEXT FUNCTION

; ***** WATER MODE *****

017C    99 FB   WATER:  ANL     P1,#(NOT 00000100B)     ;TURN ON WATER SOLENOID
017E    04 31           JMP     LOOP
```

```
0180    F0              CKMOD3: MOV     A,@R0
0181    D3 04                   XRL     A,#SLOMOD       ;SLOW FIL MODE
0183    96 9B                   JNZ     AUTAIR

; ***** SLOW/FAST FILL MODE *****

0185    95              SLOWFL: CPL     F0              ;TOGGLE THE SLOW/FAST FLAG
0186    B6 8D                   JF0     SLOOFF          ;SLOW FILL OFF
0188    23 01                   MOV     A,#1
018A    8E                      ORLD    P6,A            ;TURN ON THE SLOW FILL INDICATOR
018B    24 8F                   JMP     KBWAIT 018D    27              SLOOFF: CLR     A
018E    9E                      ANLD    P6,A            ;TURN OFF THE SLOW FILL INDICATOR 018F    0E              KBWAIT: INS     A,BUS           ;GET KEYBOARD DATA
0190    37                      CPL     A
0191    53 3F                   ANL     A,#3FH
0193    96 8F                   JNZ     KBWAIT          ;SLOW/FAST STILL PRESSED ??
0195    BC 14                   MOV     R4,#20          ; YES... WAIT FOR RELEASE
0197    54 A8                   CALL    DBNC2           ;LONG KEY RELEASE DELAY
0199    04 31                   JMP     LOOP

; ***** AUTOMATIC AIR MODE *****

019B    B9 30           AUTAIR: MOV     R1,#LSTKEY      ;LAST KEY READ (UP OR DOWN OR NONE)
019D    F1                      MOV     A,@R1
019E    C6 A3                   JZ      TRNSFR          ;NO KEYS PRESSED LAST TIME (START LONG DELAY)
01A0    D0                      XRL     A,@R0
01A1    C6 AB                   JZ      SAMKEY          ;SAME KEY STILL PRESSED

01A3    F0              TRNSFR: MOV     A,@R0           ;GET CURRENT KEY
01A4    A1                      MOV     @R1,A           ;TRANSFER CURRENT KEY TO LAST KEY

01A5    B9 2A                   MOV     R1,#KDELAY      ;KEY DELAY
01A7    B1 21                   MOV     @R1,#LONGD      ;LONG KEY DELAY
01A9    24 B2                   JMP     UPDN?           ;CHECK FOR UP OR DOWN

01AB    B9 2A           SAMKEY: MOV     R1,#KDELAY
01AD    F1                      MOV     A,@R1           ;IS KEY DELAY = 0 ??
01AE    96 EF                   JNZ     GOLOOP          ; NO... JUST WAIT

01B0    B1 05           LDSHRT: MOV     @R1,#SHORTD     ; YES... LOAD SHORT KEY DELAY
01B2    B8 2B           UPDN?:  MOV     R0,#VLVTIM      ;STARTING LOCATION TO CLEAR
01B4    BC 04                   MOV     R4,#4
01B6    54 A0                   CALL    CLRMEM          ;CLEAR VALVE TIME, AUTO AIR STARTED FLAG, BEEPER
01B8    A5                      CLR     F1              ;FLAG, AND READ PRESSURE DELAY STARTED FLAG

01B9    89 3C                   ORL     P1,#00111100B   ;EVERYTHING OFF EXCEPT COMPRESSOR

01BB    B8 31                   MOV     R0,#MODE
01BD    F0                      MOV     A,@R0           ;GET CURRENT KEY
01BE    D3 01                   XRL     A,#UPKEY
01C0    C6 CB                   JZ      BMPUP           ;BUMP THE SETPOINT UP

; ***** BUMP SETPOINT DOWN *****

01C2    B8 32           BMPDWN: MOV     R0,#SETPT       ;GET THE SETPOINT
01C4    F0                      MOV     A,@R0
01C5    C6 D3                   JZ      DSPSET          ;SETPOINT ALREADY AT ZERO... DISPLAY IT

01C7    07                      DEC     A               ;SETPOINT - 1
01C8    A0                      MOV     @R0,A
01C9    24 D3                   JMP     DSPSET          ;DISPLAY THE SETPOINT

; ***** BUMP SETPOINT UP *****

01CB    B8 32           BMPUP:  MOV     R0,#SETPT       ;GET CURRENT SETPOINT
01CD    F0                      MOV     A,@R0
01CE    D3 64                   XRL     A,#100          ;ALREADY AT 100 LBS ??
01D0    C6 D3                   JZ      DSPSET          ;YES... DON'T DO ANYTHING
01D2    10                      INC     @R0             ;SETPOINT + 1

01D3    0F              DSPSET: MOVD    A,P7
01D4    53 08                   ANL     A,#SWTCH4       ;GET THE ENGLISH/METRIC SWITCH
01D6    C6 DC                   JZ      KPASET          ;SETPOINT IS IN KPA

01D8    F0              LBSSET: MOV     A,@R0           ;GET SETPOINT
01D9    AB                      MOV     R3,A
01DA    24 5C                   JMP     DSPLBS          ;DISPLAY IT IN LBS

01DC    F0              KPASET: MOV     A,@R0           ;GET SETPOINT
01DD    AB                      MOV     R3,A
01DE    24 64                   JMP     KPA             ;CONVERT AND DISPLAY IT IN KPA

; ***** AUTO AIR FILL/VENT LOOP *****

01E0    B8 2E           AANOKY: MOV     R0,#AASTRT      ;HAS THE AUTO AIR BEEN STARTED ??
01E2    F0                      MOV     A,@R0
```

```
01E3    96 F1              JNZ     CHKTO           ;YES... CHECK FOR DELAY TIMEOUT

01E5    B8 1D       STRTAA: MOV    R0,#AADELY
01E7    B0 42              MOV     @R0,#AADLTM     ;AUTO AIR START DELAY TIME
01E9    B8 2E              MOV     R0,#AASTRT
01EB    B0 01              MOV     @R0,#1          ;SET THE AUTO START DELAY ON FLAG

01ED    A5                 CLR     F1              ;TURN ON THE BEEPER
01EE    B5                 CPL     F1
01EF    04 31       GOLOOP: JMP    LOOP

01F1    B8 1D       CHKTO:  MOV    R0,#AADELY      ;GET THE AUTO AIR START DELAY TIME
01F3    F0                 MOV     A,@R0
01F4    96 EF              JNZ     GOLOOP          ;DELAY ISN'T OVER... JUST WAIT

01F6    99 BF       GOAUTO: ANL    P1,#(NOT 01000000B)  ;AIR COMPRESSOR ON

01F8    B8 2B       CKVLVT: MOV    R0,#VLVTIM
01FA    F0                 MOV     A,@R0           ;GET VALVE TIMER
01FB    96 EF              JNZ     GOLOOP          ;FINISHED

01FD    89 18       TIMOUT: ORL    P1,#00011000B   ;VALVES OFF

01FF    B8 2D              MOV     R0,#RPDLFL      ;READ PRESSURE DELAY FLAG
0201    F0                 MOV     A,@R0
0202    96 0C              JNZ     RDTMR           ;START READ DELAY

0204    B0 01       STRRDD: MOV    @R0,#1          ;SET THE DELAY TIMER STARTED FLAG
0206    B8 1B              MOV     R0,#RDLTMR      ;READ DELAY TIMER
0208    B0 31              MOV     @R0,#49         ;1.48 SECOND DELAY
020A    04 31       LOOPX:  JMP    LOOP

020C    B8 1B       RDTMR:  MOV    R0,#RDLTMR      ;READ DELAY TIMER
020E    F0                 MOV     A,@R0
020F    96 0A              JNZ     LOOPX           ;WAIT FOR DELAY TO END

0211    B8 2D       RDPRSR: MOV    R0,#RPDLFL
0213    B0 00              MOV     @R0,#0          ;RESET THE READ DELAY TIMER STARTED FLAG
0215    54 5E              CALL    GETPRE          ;READ THE PRESSURE
0217    AA                 MOV     R2,A            ;SAVE A COPY OF THE PRESSURE

0218    B8 32              MOV     R0,#SETPT
021A    F0                 MOV     A,@R0           ;GET THE SETPOINT
021B    37                 CPL     A
021C    6A                 ADD     A,R2            ;SETPOINT - ACTUAL PRESSURE
021D    37                 CPL     A
021E    C6 41              JZ      EQUAL           ;PRESSURE NOT EQUAL TO SETPOINT

0220    B6 30              JF0     NOTEQL          ;NOT IN SLOW FILL MODE SO JUST KEEP GOING
0222    AA                 MOV     R2,A            ;SAVE THE VALUE (SET-POINT - PRESSURE)
0223    C7                 MOV     A,PSW
0224    A9                 MOV     R1,A            ;SAVE THE CARY FLAG
0225    FA                 MOV     A,R2
0226    17                 INC     A               ;-1 ??
0227    C6 41              JZ      EQUAL           ;YES... FINISHED
0229    07                 DEC     A
022A    07                 DEC     A               ;+1 ??
022B    C6 41              JZ      EQUAL           ;YES... FINISHED
022D    F9                 MOV     A,R1
022E    D7                 MOV     PSW,A           ;RESTORE CARRY FLAG
022F    FA                 MOV     A,R2            ;RESTORE (SET-POINT - PRESSURE)

0230    A5          NOTEQL: CLR    F1              ;TURN ON THE BEEPER
0231    B5                 CPL     F1

0232    F6 44              JC      PRSGRT          ;PRESSURE GREATER THAN SETPOINT 0234    54 4E              CALL    CHKG20          ;CHECK TO SEE IF DIFFERENCE IS > 20 LBS 0236    03 C9       CONT1:  ADD    A,#(LOW FILAIR) ;FILL-AIR VALUE TABLE
0238    99 EF              ANL     P1,#(NOT 00010000B)  ;TURN ON FILL VALVE

023A    B8 2B       FVTIME: MOV    R0,#VLVTIM
023C    AA                 MOV     R2,A            ;SAVE A COPY OF THE TABLE ADDRESS
023D    E3                 MOVP3   A,@A            ;GET THE MSD OF VALVE TIME
023E    A0                 MOV     @R0,A           ;STORE IT 023F    04 31              JMP     LOOP

0241    A5          EQUAL:  CLR    F1              ;TURN OFF THE BEEPER
0242    04 31              JMP     LOOP 0244    37          PRSGRT: CPL    A
0245    17                 INC     A               ;GET DIFFERENCE 0246    54 4E              CALL    CHKG20          ;CHECK TO SEE IF DIFFERENCE IS > 20 LBS 0248    03 DF       CONT2:  ADD    A,#(LOW VNTAIR) ;VENT-AIR VALUE TABLE
024A    99 F7              ANL     P1,#(NOT 00001000B)  ;VENT VALVE ON
024C    44 3A              JMP     FVTIME

024E    B6 52       CHKG20: JF0    CKG20A          ;NOT IN SLOW FILL MODE
0250    27                 CLR     A               ;SLOW FILL MODE... USE SLOWEST FILL, VENT TIMES
0251    83                 RET
```

```
0252    A9              CKG20A: MOV     R1,A            ;SAVE THE DIFFERENCE
0253    37                      CPL     A
0254    03 15                   ADD     A,#21           ;DIFFERENCE - 21
0256    37                      CPL     A

0257    E6 5B                   JNC     GRT20           ;MORE THAN 20 LBS AWAY FROM SETPOINT
0259    F9                      MOV     A,R1
025A    83                      RET 025B    23 15           GRT20:  MOV     A,#21           ;21st TABLE ENTRY ... MAX VENT OR FILL TIME
025D    83                      RET

; ***** GET A PRESSURE READING *****

025E    54 6E           GETPRS: CALL    ADCONV          ;GET THE PRESSURE
0260    A9                      MOV     R1,A
0261    BA 0A                   MOV     R2,#10
0263    74 43                   CALL    MULT            ;PRESSURE * 10
0265    AA                      MOV     R2,A
0266    F9                      MOV     A,R1
0267    AB                      MOV     R3,A
0268    23 19                   MOV     A,#25           ;PRESSURE * 10 /.25 = REAL PRESSURE
026A    74 14                   CALL    DIV
026C    FC                      MOV     A,R4            ;RESULT IN A
026D    83                      RET

; ***** PERFORM AN ADC CONVERSION... *****

026E    9A DF           ADCONV: ANL     P2,#(NOT 20H)   ;SELECT THE ADC-0834
0270    00                      NOP
0271    54 84                   CALL    ADCPLS          ;PULSE THE ADC CLOCK
0273    BA 08                   MOV     R2,#8           ;8 DATA BITS TO READ 0275    54 84           DILOOP: CALL    ADCPLS          ;PULSE THE CLOCK LINE
0277    00                      NOP
0278    0A                      IN      A,P2            ;DATA BIT IS BIT 7 (80H)
0279    F7                      RLC     A
027A    FB                      MOV     A,R3            ;GET PREVIOUS BITS
027B    F7                      RLC     A               ;ADD IN THE NEW BIT
027C    AB                      MOV     R3,A            ;SAVE THE RESULT
027D    EA 75                   DJNZ    R2,DILOOP 027F    54 84                   CALL    ADCPLS          ;EXTRA CLOCK PULSE FOR GRINS 0281    8A 20                   ORL     P2,#20H         ;DE-SELECT ADC-0834
0283    83                      RET 0284    8A 40           ADCPLS: ORL     P2,#40H         ;CLOCK LINE HIGH
0286    BF 02           SDELAY: MOV     R7,#2
0288    EF 88           SDELY1: DJNZ    R7,SDELY1
028A    9A BF                   ANL     P2,#(NOT 40H)   ;CLOCK LINE LOW
028C    83                      RET

; ***** CHECK FOR ONE BIT ONLY SET IN R2 *****

028D    BB 08           ONEKEY: MOV     R3,#8           ;BIT COUNT
028F    BC 00                   MOV     R4,#0           ;KEY COUNT
0291    FA                      MOV     A,R2
0292    67              BITCHK: RRC     A               ;IS THE BIT SET ??
0293    E6 96                   JNC     NOTSET          ;NO
0295    1C                      INC     R4              ;BUMP THE SET BIT COUNT (KEY COUNT)
0296    EB 92           NOTSET: DJNZ    R3,BITCHK 0298    23 01                   MOV     A,#1            ;ONLY ONE KEY DOWN ??
029A    DC                      XRL     A,R4            ;RETURN WITH ACCUM. = 0 IF TRUE
029B    83                      RET

; ***** CLEAR DATA MEMORY *****

029C    BB 18           CLRALL: MOV     R0,#24          ;REGISTER BANK 1, R0
029E    BC 27                   MOV     R4,#63-24       ;END OF RAM
02A0    27              CLRMEM: CLR     A               ;CLEAR MEMORY
02A1    A0              CLMLUP: MOV     @R0,A
02A2    18                      INC     R0
02A3    EC A1                   DJNZ    R4,CLMLUP
02A5    83                      RET

; ***** DEBOUNCE COIN SWITCH AND KEYBOARD *****

02A6    BC 07           DEBNCE: MOV     R4,#7
02A8    BD 00           DBNC2:  MOV     R5,#0           ;SWITCH AND COIN DEBOUNCE TIME
02AA    ED AA           DBNC1:  DJNZ    R5,DBNC1
02AC    EC A8                   DJNZ    R4,DBNC2
02AE    83                      RET

; ***** SEND DATA TO A 5450 (R0 POINTS TO MSD OF DATA)
```

```
02AF    B8 20    DISPLA:  MOV    R0,#DSPBUF       ;DISPLAY BUFFER
02B1    BC 24    SEND3E:  MOV    R4,#3E           ;36 BITS TO SEND
02B3    BD 04             MOV    R5,#4            ;NUMBER OF VALID BYTES TO SEND

02B5    89 02             ORL    P1,#02H          ;SET START BIT HIGH
02B7    54 D7             CALL   STROBE

02B9    F0       BYTES:   MOV    A,@R0            ;GET THE BYTE
02BA    54 CE             CALL   SEND8            ;SEND 8 BITS TO THE LEDS
02BC    18                INC    R0               ;POINT TO NEXT BYTE TO SEND
02BD    ED B9             DJNZ   R5,BYTES         ;SEND ALL THE BYTES

02BF    99 FD    CLENUP:  ANL    P1,#(NOT 02H)    ;RESET DATA BIT
02C1    54 D7             CALL   STROBE           ;SEND THE REMAINING DATA BITS
02C3    EC BF             DJNZ   R4,CLENUP
02C5    83                RET

02C6    BE 08    SEND8:   MOV    R6,#8            ;8 BITS TO SEND
02C8    67       LOOP8:   RRC    A                ;TEST THE BIT
02C9    F6 CF             JC     ONE1

02CB    99 FD             ANL    P1,#(NOT 02H)    ;SET DATA BIT LOW
02CD    44 D1             JMP    NEXT

02CF    89 02    ONE1:    ORL    P1,#02H          ;SET DATA BIT HIGH
02D1    54 D7    NEXT:    CALL   STROBE
02D3    CC                DEC    R4               ;BUMP THE TOTAL BIT COUNT
02D4    EE C8             DJNZ   R6,LOOP8         ;SEND ALL 8 BIT
02D6    83                RET

02D7    89 01    STROBE:  ORL    P1,#01H          ;SET CLOCK HIGH
02D9    54 86             CALL   SDELAY           ;STROBE DELAY
02DB    99 FE             ANL    P1,#(NOT 01H)    ;SET CLOCK LOW
02DD    83                RET

;  *****   DISPLAY DASHES  *****

02DE    B9 20    DSPDSH:  MOV    R1,#DSPBUF
02E0    BA 04             MOV    R2,#4            ;DISPLAY ---
02E2    B1 40    DSHLUP:  MOV    @R1,#01000000B
02E4    19                INC    R1
02E5    EA E2             DJNZ   R2,DSHLUP
02E7    54 AF             CALL   DISPLA           ;DISPLAY IT
02E9    83                RET

;  *****   BINARY TO BCD CONVERSION  *****
;   ON ENTRY   R2=MSD  R3=LSD   BINARY VALUE

02EA    BE 00    BINBCD:  MOV    R6,#0            ;LZB FLAG
02EC    B9 20             MOV    R1,#DSPBUF       ;DISPLAY BUFFER
02EE    23 64             MOV    A,#100
02F0    74 14             CALL   DIV              ;EXTRACT THE MSD OF THE BINARY VALUE
02F2    74 04             CALL   STRDIG           ;STORE A DIGIT OF THE BCD VALUE
02F4    FA                MOV    A,R2             ;GET REMAINDER
02F5    AB                MOV    R3,A
02F6    BA 00             MOV    R2,#0
02F8    23 0A             MOV    A,#10
02FA    74 14             CALL   DIV              ;EXTRACT THE CSD OF THE BINARY VALUE
02FC    74 04             CALL   STRDIG
02FE    FA                MOV    A,R2             ;GET REMAINDER
02FF    03 F5             ADD    A,#(LOW SEGMNT)
0301    E3                MOVP3  A,@A
0302    A1                MOV    @R1,A            ;STORE THE LSD OF THE BINARY VALUE
0303    83                RET

0304    FC       STRDIG:  MOV    A,R4             ;LSD OF RESULT
0305    6E                ADD    A,R6             ;NO-BLANK FLAG
0306    96 0C             JNZ    STUF1            ;DON'T BLANK IF NOT 0 OR IF NO-BLANK FLAG SET
0308    BC 0A             MOV    R4,#10           ;LZB CODE
030A    64 0D             JMP    STUF2
030C    1E       STUF1:   INC    R6               ;SET THE NO-BLANK FLAG
030D    FC       STUF2:   MOV    A,R4
030E    03 F5    STUFIT:  ADD    A,#(LOW SEGMNT)
0310    E3                MOVP3  A,@A             ;GET SEGMENT DATA
0311    A1                MOV    @R1,A
0312    19                INC    R1               ;POINT TO NEXT DISPLAY BUFFER LOCATION
0313    83                RET

;  *****  16 X 8 DIVIDE   (R3[MSD],R4 = R2[MSD],R3/A)  R2=REMAINDER  *****

0314    BD 09    DIV:     MOV    R5,#9
0316    A8                MOV    R0,A
0317    97       DV0:     CLR    C
0318    F2 25             JB7    DV1
031A    37                CPL    A
031B    6A                ADD    A,R2
```

```
031C    E6 25              JNC     DV1
031E    37                 CPL     A
031F    1D                 INC     R5
0320    F8                 MOV     A, R0
0321    E7                 RL      A
0322    A8                 MOV     R0, A
0323    64 17              JMP     DV0

0325    BC 00       DV11:  MOV     R4, #0
0327    FA                 MOV     A, R2

0328    37          DV2:   CPL     A
0329    F6 30              JC      DV3
032B    68                 ADD     A, R0
032C    F6 34              JC      DV5
032E    64 32              JMP     DV4

0330    68          DV3:   ADD     A, R0
0331    97                 CLR     C 0332    37          DV4:   CPL     A
0333    AA                 MOV     R2, A

0334    A7          DV5:   CPL     C
0335    FC                 MOV     A, R4
0336    F7                 RLC     A
0337    AC                 MOV     R4, A
0338    FB                 MOV     A, R3
0339    F7                 RLC     A
033A    AB                 MOV     R3, A
033B    FA                 MOV     A, R2
033C    F7                 RLC     A
033D    AA                 MOV     R2, A
033E    ED 28              DJNZ    R5, DV2
0340    67                 RRC     A
0341    AA                 MOV     R2, A
0342    83          ENDDIV: RET

;  *****  8 X 8 BINARY MULTIPLY  (ON ENTRY R1=MULTIPLIER, R2=MULTIPLICAND)
             ;                                (ON EXIT  A=MSD, R1=LSD)

0343    BB 08       MULT:  MOV     R3, #8
0345    27                 CLR     A
0346    97                 CLR     C 0347    67          BMP1:  RRC     A
0348    29                 XCH     A, R1
0349    67                 RRC     A
034A    29                 XCH     A, R1
034B    E6 4E              JNC     BMP3
034D    6A                 ADD     A, R2

034E    EB 47       BMP3:  DJNZ    R3, BMP1
0350    67                 RRC     A
0351    29                 XCH     A, R1
0352    67                 RRC     A
0353    29                 XCH     A, R1
0354    83                 RET

;  *****  TIMER INTERRUPT  *****

0355    D5          TIMER: SEL     RB1            ;SAVE REGISTERS AND ACC.
0356    AF                 MOV     R7, A
0357    23 1E              MOV     A, #TIMDIV     ;TIMER RELOAD VALUE
0359    62                 MOV     T, A
035A    55                 STRT    T              ;RELOAD AND RESTART TIMER

035B    B8 2A              MOV     R0, #KDELAY
035D    F0                 MOV     A, @R0         ;GET THE KEY DELAY TIMES
035E    C6 62              JZ      TIMER1
0360    07                 DEC     A              ;BUMP IT
0361    A0                 MOV     @R0, A         ;SAVE IT

0362    FD          TIMER1: MOV    A, R5          ;GET THE AUTO AIR START DELAY
0363    C6 66              JZ      TIMER2
0365    CD                 DEC     R5             ;BUMP IT

0366    B8 2B       TIMER2: MOV    R0, #VLVTIM    ;VALVE TIMER
0368    F0                 MOV     A, @R0         ;GET LST
0369    C6 6D              JZ      TIMER3
036B    07                 DEC     A              ;BUMP IT
036C    A0                 MOV     @R0, A         ;SAVE IT 036D    76 74       TIMER3: JF1    CKBEEP
036F    F9                 MOV     A, R1
0370    96 83              JNZ     BEPON1         ;RESET BEEP TIME (BEEPER OFF)
0372    64 7F              JMP     BEEPOF 0374    1C          CKBEEP: INC    R4             ;BUMP THE BEEP PERIOD
0375    FC                 MOV     A, R4
```

```
037E    92 84                  JB4      BEEPON            ;BEEP ON A 16 CYCLE PERIOD

0378    F9                     MOV      A,R1
0379    96 83                  JNZ      BEPON1            ;DON'T TURN OFF KEY BEEP
037B    64 7F                  JMP      BEEPOF

037D    BC 00          RESBPT: MOV      R4,#0             ;RESET BEEPER DUTY CYCLE COUNTER
037F    99 7F          BEEPOF: ANL      P1,#01111111B     ;TURN OFF BEEPER
0381    64 86                  JMP      TIMER4

0383    C9             BEPON1: DEC      R1
0384    89 80          BEEPON: ORL      P1,#10000000B     ;TURN ON BEEPER

0386    CE             TIMER4: DEC      R6                ;DIVIDE BY 33 COUNTER
0387    FE                     MOV      A,R6
0388    96 9E                  JNZ      TIMER5            ;FINISHED WITH TIMER STUFF

038A    BE 21          ONESEC: MOV      R6,#33            ;DIVIDER (33 TIMER INT. PER SECOND)
038C    B8 34                  MOV      R0,#CYCTIM+1
038E    F0                     MOV      A,@R0             ;GET CYCLE TIME LSD
038F    C6 95                  JZ       MSDBMP
0391    07                     DEC      A
0392    A0                     MOV      @R0,A             ;BUMP IT AND STORE IT
0393    64 9E                  JMP      TIMER5

0395    C8             MSDBMP: DEC      R0
0396    F0                     MOV      A,@R0             ;GET CYCLE TIME MSD
0397    C6 9E                  JZ       TIMER5
0399    07                     DEC      A
039A    A0                     MOV      @R0,A             ;BUMP IT AND STORE IT
039B    18                     INC      R0
039C    B0 FF                  MOV      @R0,#0FFH         ;CORRECT LSD

039E    FB             TIMER5: MOV      A,R3              ;READ DELAY TIMER
039F    C6 A2                  JZ       TIMER6
03A1    CB                     DEC      R3                ;BUMP THE TIME

03A2    FA             TIMER6: MOV      A,R2              ;CHECK PRESSURE DISPLAY UPDATE TIMER
03A3    C6 A6                  JZ       DONE              ;FINISHED
03A5    CA                     DEC      R2                ;BUMP THE TIME

03A6    FF             DONE:   MOV      A,R7              ;RESTORE ACCUM.
03A7    C5                     SEL      RB0               ;RESTORE REGISTERS
03A8    93                     RETR

;       *****  SWITCH TEST ROUTINE  *****

03A9    B9 20          TEST:   MOV      R1,#DSPBUF        ;DISPLAY BUFFER
03AB    0F                     MOVD     A,P7
03AC    37                     CPL      A
03AD    53 0F                  ANL      A,#0FH
03AF    74 0E                  CALL     STUFIT
03B1    0C                     MOVD     A,P4              ;AIR TIME
03B2    D3 0F                  XRL      A,#0FH            ;SWITCH DATA IS INVERTED
03B4    74 0E                  CALL     STUFIT            ;CONVERT TO 7 SEG.
03B6    0D                     MOVD     A,P5              ; COINS
03B7    D3 0F                  XRL      A,#0FH            ;SWITCH DATA IS INVERTED
03B9    74 0E                  CALL     STUFIT
03BB    54 AF                  CALL     DISPLA            ;DISPLAY IT
03BD    08                     INS      A,BUS             ;GET THE KEYBOARD
03BE    53 3F                  ANL      A,#3FH            ;STRIP UPPER TWO BITS
03C0    D3 20                  XRL      A,#20H            ;INVERT THE BEEPER BIT
03C2    E7                     RL       A
03C3    E7                     RL       A                 ;SHIFT INTO OUTPUT BITS (2-7)
03C4    39                     OUTL     P1,A
03C5    26 A9                  JNT0     TEST              ;PERFORM TEST AS LONG AS COIN INPUT HIGH

03C7    04 17                  JMP      STRTMR            ;TEST OVER... START MAIN PROGRAM

;       *****  FILL / VENT TIMING TABLES  *****

03C9    02             FILAIR: DB       2
03CA    07             F1:     DB       7
03CB    0F             F2:     DB       15
03CC    1E             F3:     DB       30
03CD    2D             F4:     DB       45
03CE    37             F5:     DB       55
03CF    41             F6:     DB       65
03D0    4B             F7:     DB       75
03D1    4B             F8:     DB       75
03D2    4B             F9:     DB       75
03D3    55             F10:    DB       85
03D4    55             F11:    DB       85
03D5    64             F12:    DB       100
03D6    78             F13:    DB       120
03D7    8C             F14:    DB       140
03D8    A0             F15:    DB       160
03D9    B4             F16:    DB       180
03DA    C8             F17:    DB       200
03DB    D2             F18:    DB       210
03DC    DC             F19:    DB       220
03DD    FF             F20:    DB       255
03DE    21             FGT20:  DB       33*1
```

```
03DF    02              VNTAIR: DB      2
03E0    0A              V1:     DB      10
03E1    0F              V2:     DB      15
03E2    21              V3:     DB      33
03E3    42              V4:     DB      33*2
03E4    42              V5:     DB      33*2
03E5    63              V6:     DB      33*3
03E6    63              V7:     DB      33*3
03E7    84              V8:     DB      33*4
03E8    84              V9:     DB      33*4
03E9    A5              V10:    DB      33*5
03EA    A5              V11:    DB      33*5
03EB    C6              V12:    DB      33*6
03EC    C6              V13:    DB      33*6
03ED    C6              V14:    DB      33*6
03EE    C6              V15:    DB      33*6
03EF    E7              V16:    DB      33*7
03F0    E7              Q17:    DB      33*7
03F1    E7              V18:    DB      33*7
03F2    E7              V19:    DB      33*7
03F3    FF              V20:    DB      255
03F4    21              VGT20:  DB      33*1

03F5    3F              SEGMNT: DB      00111111B       ;0   BIT 0 = SEG. A
03F6    06                      DB      00000110B       ;1
03F7    5B                      DB      01011011B       ;2
03F8    4F                      DB      01001111B       ;3
03F9    66                      DB      01100110B       ;4
03FA    6D                      DB      01101101B       ;5
03FB    7D                      DB      01111101B       ;6
03FC    07                      DB      00000111B       ;7
03FD    7F                      DB      01111111B       ;8
03FE    6F                      DB      01101111B       ;9
03FF    00                      DB      00000000B       ;LZB CODE

END     START
```

MICRO-AIR BOARD   (AIR.MAC)

Macros:
PULSE

Symbols:

| | | | | | | | | |
|---|---|---|---|---|---|---|---|---|---|
| AADELY | 001D | AADLTM | 0042 | AANDKY | 01E0 | AASTRT | 002E | | |
| ACTHI1 | 0061 | ACTHI2 | 006E | ACTHI3 | 007D | ADCONV | 026E | | |
| ADCPLS | 0284 | ALLOFF | 0111 | AUTAIR | 019B | BEEPOF | 037F | | |
| BEEPON | 0384 | BEPON1 | 0383 | BINBCD | 02EA | BITCHK | 0202 | | |
| BMP1 | 0347 | BMP3 | 034E | BMPDWN | 01C2 | BMPUP | 01CB | | |
| BYTES | 02B9 | CHGM1 | 00CF | CHGMOD | 0103 | CHKAAR | 00FC | | |
| CHKG20 | 024E | CHKIT | 0152 | CHKMOD | 0008 | CHKTIM | 001A | | |
| CHKTO | 01F1 | CKBEEP | 0374 | CKG20A | 0252 | CKMODC | 013E | | |
| CKMOD1 | 0146 | CKMOD2 | 0177 | CKMOD3 | 0180 | CKVLVT | 01F8 | | |
| CLENUP | 02BF | CLMLUP | 02A1 | CLRALL | 029C | CLRMEM | 02A0 | | |
| CMODE1 | 0113 | COIN | 0072 | COIN1 | 007F | COIN? | 0051 | | |
| COIN?1 | 0065 | COINCT | 0028 | COINFL | 0040 | COMPON | 010D | | |
| CONT1 | 0236 | CONT2 | 0248 | CYCINP | 002F | CYCTIM | 0033 | | |
| DATA | 0020 | DBNC1 | 02AA | DBNC2 | 02A8 | DEBNCE | 02A6 | | |
| DILOOP | 0275 | DISPLA | 02AF | DIV | 0314 | DNKEY | 0002 | | |
| DNMOD | 0002 | DONE | 03A6 | DSHLUP | 02E2 | DSPBUF | 0020 | | |
| DSPDSH | 02DE | DSPKPA | 015E | DSPLBS | 015C | DSPSET | 01D3 | | |
| DV0 | 0317 | DV1 | 0325 | DV2 | 0328 | DV3 | 0330 | | |
| DV4 | 0332 | DV5 | 0334 | ENDATA | 003F | ENDDIV | 0342 | | |
| EQUAL | 0241 | EXEC1 | 00CD | EXECUT | 0137 | EXIT | 0020 | | |
| F1 | 03CA | F10 | 03D3 | F11 | 03D4 | F12 | 03D5 | | |
| F13 | 03D6 | F14 | 03D7 | F15 | 03D8 | F16 | 03D9 | | |
| F17 | 03DA | F18 | 03DB | F19 | 03DC | F2 | 03CB | | |
| F20 | 03DD | F3 | 03CC | F4 | 03CD | F5 | 03CE | | |
| F6 | 03CF | F7 | 03D0 | F8 | 03D1 | F9 | 03D2 | | |
| FGT20 | 03DE | FILAIR | 03C9 | FVTIME | 023A | GETKEY | 00A7 | | |
| GETKY1 | 00AD | GETPRS | 025E | GOAUTO | 01F6 | GOLOOP | 01EF | | |
| GRT20 | 025B | KBWAIT | 018F | KDELAY | 002A | KEYBEP | 0019 | | |
| KPA | 0164 | KPASET | 01DC | LBSSET | 01DB | LDSHRT | 01B0 | | |
| LONGD | 0021 | LOOP | 0031 | LOOPB | 02C8 | LOOPX | 020A | | |
| LSTKEY | 0030 | MAIN | 0096 | MODE | 0031 | MSDBMP | 0395 | | |
| MULT | 0343 | NEWMOD | 00B3 | NEXT | 02D1 | NK1 | 00CB | | |
| NMODE1 | 00D1 | NMODE2 | 00E6 | NMODE3 | 00F4 | NOKEY1 | 0128 | | |
| NOKEYS | 0121 | NOTEQL | 0230 | NOTPCK | 00DE | NOTSET | 0298 | | |
| NULL | 002C | ONE1 | 02CF | ONEKEY | 028D | ONESEC | 038A | | |
| PAID | 0025 | PAID1 | 008C | PAID2 | 0092 | PAIDSS | 002E | | |
| PAYMOD | 0027 | PRSCHK | 014B | PRSGRT | 0244 | Q17 | 03F0 | | |
| RDLTMR | 001B | RDPRSR | 0211 | RDTMR | 020C | REGB1 | 0016 | | |
| RESBPT | 037D | RPDLFL | 002D | SAMKEY | 01AB | SDELAY | 028E | | |
| SDELY1 | 0288 | SEGMNT | 03F5 | SEND3E | 02B1 | SEND8 | 02C6 | | |
| SETCIP | 004D | SETPT | 0032 | SHORTD | 0005 | SLOFIL | 0037 | | |
| SLOMOD | 0004 | SLOOFF | 018D | SLOWFL | 0185 | START | 0000 | | |
| START1 | 0009 | START2 | 0010 | STRDIG | 0304 | STROBE | 02D7 | | |
| STRRDD | 0204 | STRTAR | 01E5 | STRTCY | 003D | STRTMR | 0017 | | |
| STUF1 | 030C | STUF2 | 030D | STUFIT | 030E | SWTCH1 | 0001 | | |
| SWTCH2 | 0002 | SWTCH3 | 0004 | SWTCH4 | 0008 | TEST | 03A9 | | |
| TIMDIV | 001E | TIMER | 0355 | TIMER1 | 0362 | TIMER2 | 036E | | |
| TIMER3 | 036D | TIMER4 | 0386 | TIMER5 | 039E | TIMER6 | 03A2 | | |
| TIMOJT | 01FD | TRNSFR | 01A3 | UDMODE | 0131 | UPDN? | 01B2 | | |
| UPKEY | 0001 | UPMOD | 0001 | V1 | 03E0 | V10 | 03E9 | | |

```
V11     03EA    V12    03EB    V13     03EC    V14     03ED
V15     03EE    V16    03EF    V18     03F1    V19     03F2
V2      03E1    V20    03F3    V3      03E2    V4      03E3
V5      03E4    V6     03E5    V7      03E6    V8      03E7
V9      03E8    VACMOD 0020    VACUUM  0142    VGT20   03F4
VLVTIM  002B    VNTAIR 03DF    WAIT1   0079    WATER   017C
WTRMOD  0010
```

No Fatal error(s)

Although the present invention has been described with reference to a preferred embodiment, modifications, substitutions, and rearrangements could be made, and still the result would be within the scope of the invention.

What is claimed is:

1. A system for adjusting the air pressure in automobile tires and other inflatable devices comprising:
   a source of pressurized air;
   normally closed inflation valve means having an inlet connected to said source of pressurized air and an outlet connectable to an inflatable device for inflation thereof;
   normally closed vent means having an inlet connectable to the inflatable device and an outlet for venting the inflatable device;
   pressure selector means manually operable by a user of said system for selecting a desired air pressure for the inflatable devices said pressure selector means including delay means responsive to the desired air pressure being increased to a preset level for inhibiting further increasing of the desired air pressure for a fixed time while holding the desired pressure at said preset level, and responsive to further continuous operation of said pressure selector means for further increasing the desired air pressure, thereby reducing the likelihood of inadvertent selection of a desired air pressure greater than the preset level;
   pressure sensing means for sensing the actual air pressure in the inflatable device;
   comparison means for determining the pressure difference between the desired air pressure and the actual air pressure;
   first valve control means responsive to said comparison means determining that the desired air pressure exceeds the actual air pressure by at least a first predetermined amount for opening said inflation valve means for an inflation time interval having a duration which varies in response to the magnitude by which the desired air pressure exceeds the actual air pressure, to cause air to pass from said source to an inflatable device connected to said inflation valve means;
   second valve control means responsive to said comparison means determining that the actual air pressure exceeds the desired air pressure by at least a second predetermined amount for opening said vent valve means for a vent time interval, to vent air from an inflatable device connected to said valve means inlet; and
   means for operating said sensing means and said comparison means upon closure of said inflation valve means or said vent valve means at the end of an inflation time interval or a vent time interval.

2. A system for adjusting the air pressure in automobile tires and other inflatable devices comprising:
   a source of pressurized air;
   normally closed inflation valve means having an inlet connected to said source of pressurized air and an outlet connectable to an inflatable device for inflation thereof;
   normally closed vent valve means having an inlet connectable to the inflatable device and an outlet for venting the inflatable device;
   pressure selector means manually operable by a user of said system for selecting a desired air pressure for the inflatable device;
   pressure sensing means for sensing the actual air pressure in the inflatable device;
   comparison means for determining the pressure difference between the desired air pressure and the actual air pressure;
   first valve control means responsive to said comparison means determining that the desired air pressure exceeds the actual air pressure by at least a first predetermined amount for opening said inflation valve means for an inflation time interval having a duration which varies in response to the magnitude by which the desired air pressure exceeds the actual air pressure, to cause air to pass from said source to an inflatable device connected to said inflation valve means and responsive to said comparison means determining that the desired air pressure exceeds the actual air pressure by at least a second predetermined amount, greater than the first predetermined amount, for opening said inflation valve means for a time interval substantially less than that required to increase the measured actual air pressure to the desired air pressure to avoid inadvertent overfilling of the inflatable device in the event initial connection of the inflation valve means to the inflatable device has resulted in an erroneously low reading of actual air pressure;
   second valve control means responsive to said comparison means determining that the actual air pressure exceeds the desired air pressure by at least a third predetermined amount for opening said vent valve means for a vent time interval, to vent air from an inflatable device connected to said valve means inlet; and
   means for operating said sensing means and said comparison means upon closure of said inflation valve means or said vent valve means at the end of an inflation time interval or a vent time interval.

3. A system for adjusting the air pressure in automobile tires and other inflatable devices comprising:
   a source of pressurized air;
   normally closed inflation valve means having an inlet connected to said source of pressurized air and an outlet connectable to an inflatable device for inflation thereof;
   normally closed vent valve means having an inlet connectable to the inflatable device and an outlet for venting the inflatable device;
   pressure selector means manually operable by a user of said system for selecting a desired air pressure for the inflatable device;

pressure sensing means for sensing the actual pressure in the inflatable device;

comparison means for determining the pressure difference between the desired air pressure and the actual air pressure;

first valve control means responsive to said comparison means determining that the desired air pressure exceeds the actual air pressure by at least a first predetermined amount for opening said inflation valve means for an inflation time interval having a duration which varies in response to the magnitude by which the desired air pressure exceeds the actual air pressure, to cause air to pass from said source to an inflatable device connected to said inflation valve means;

second valve control means responsive to said comparison means determining that the actual air pressure exceeds the desired air pressure by at least a second predetermined amount for opening said vent valve means for a vent time interval, to vent air from an inflatable device connected to said valve means inlet;

means for operating said sensing means and said comparison means upon closure of said inflation valve means or said vent valve means at the end of an inflation time interval or a vent time interval; and accessory control means for controlling operation of an accessory device and manual switching means capable of alternatively assuming a first position in which said comparison means, said first valve control means, and said second valve control means are enabled for operation while said accessory control means is inhibited and a second position in which said comparison means, said first valve control means, and said second valve control means are inhibited while said accessory control means is enabled for operation.

4. A system as claimed in claim 1, 2, or 3 wherein said first valve control means includes a manually operable slow fill selector for causing said first valve control means to change the inflation time interval to a time interval of a constant duration regardless of the magnitude of the pressure difference.

5. A system as claimed in claim 1, 2, or 3 wherein said pressure selector means includes means responsive to manual operation thereof by a user of the system for changing the desired air pressure by a fixed amount and responsive to continuous operation thereof by the user of the system for at least a preset time for changing the desired air pressure at a rate which is a multiple of said fixed amount per unit of time.

6. A system as claimed in claim 1, 2, or 3 further comprising signaling means for providing an intermittent indicator signal as air is passing from said source to the inflatable device.

7. A system as claimed in claim 6 in which said signaling means further provides the intermittent indicator signal as air is venting from the inflatable device.

8. A system as claimed in claim 1, 2, or 3 further comprising means for providing a compressor actuation signal for application to an air compressor to activate such air compressor to provide air to said source of pressurized air.

9. A system as claimed in claim 1, 2, or 3 further comprising coin receiving means for receiving and indicating reception of coins and means for inhibiting said first and second valve control means until said coin receiving means has indicated reception of at least a preset number of coins.

10. A system as claimed in claim 9 further comprising timing means responsive to said coin receiving means indicating reception of the preset number of coins for inhibiting said first and second valve control means a preset time thereafter.

11. A system as claimed in claim 1, 2, or 3 further comprising timing means for inhibiting said first and second valve control means a preset time after initial actuation thereof.

* * * * *